United States Patent
Sudou et al.

(10) Patent No.: US 10,540,009 B2
(45) Date of Patent: Jan. 21, 2020

(54) WEARABLE DEVICE, CONTROL METHOD, AND CONTROL PROGRAM

(71) Applicant: KYOCERA Corporation, Kyoto-shi, Kyoto (JP)

(72) Inventors: Tomohiro Sudou, Yokohama (JP); Daisuke Ibuki, Kusatsu (JP); Shingo Ito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/553,251

(22) PCT Filed: Feb. 24, 2016

(86) PCT No.: PCT/JP2016/055521
§ 371 (c)(1),
(2) Date: Aug. 24, 2017

(87) PCT Pub. No.: WO2016/136837
PCT Pub. Date: Sep. 1, 2016

(65) Prior Publication Data
US 2018/0032132 A1 Feb. 1, 2018

(30) Foreign Application Priority Data

Feb. 25, 2015 (JP) .................. 2015-035908
Apr. 27, 2015 (JP) .................. 2015-090332

(51) Int. Cl.
*G06F 3/01* (2006.01)
*H04M 19/04* (2006.01)
(Continued)

(52) U.S. Cl.
CPC .............. *G06F 3/013* (2013.01); *G06F 3/002* (2013.01); *G06F 3/0482* (2013.01); *G06F 3/147* (2013.01);
(Continued)

(58) Field of Classification Search
CPC ...................................................... G06F 3/013
See application file for complete search history.

(56) References Cited

U.S. PATENT DOCUMENTS

2007/0164990 A1 7/2007 Bjorklund et al.
2012/0146895 A1 6/2012 Bjorklund et al.
(Continued)

FOREIGN PATENT DOCUMENTS

JP        8-22385 A     1/1996
JP    2008-502990 A     1/2008
(Continued)

OTHER PUBLICATIONS

International Search Report in PCT/JP2016/055521, dated May 24, 2016.

*Primary Examiner* — Nelson M Rosario
*Assistant Examiner* — Scott Au
(74) *Attorney, Agent, or Firm* — Hauptman Ham, LLP

(57) ABSTRACT

As one of aspects of the present invention, a wearable device includes a display having a display area virtually divided into a first area and a second area. When a user's gaze position moves from the first area to the second area while an object corresponding to a predetermined function is displayed within the first area, the predetermined function is executed. The wearable device further includes a controller for detecting a user's gaze position with respect to the display and a user's gaze movement in the display.

19 Claims, 20 Drawing Sheets

(51) Int. Cl.
  *G09G 5/14* (2006.01)
  *G06F 3/0482* (2013.01)
  *G06F 3/00* (2006.01)
  *G06F 3/147* (2006.01)

(52) U.S. Cl.
  CPC .............. *G09G 5/14* (2013.01); *H04M 19/04* (2013.01); *G09G 2354/00* (2013.01)

(56) References Cited

U.S. PATENT DOCUMENTS

| | | | |
|---|---|---|---|
| 2013/0109478 A1* | 5/2013 | Matsumaru | A63F 13/04 463/39 |
| 2013/0176208 A1* | 7/2013 | Tanaka | G06F 3/013 345/156 |
| 2013/0187835 A1* | 7/2013 | Vaught | G06K 9/00604 345/8 |
| 2013/0318457 A1 | 11/2013 | Bjorklund et al. | |
| 2013/0321270 A1 | 12/2013 | Bjorklund et al. | |
| 2013/0326431 A1 | 12/2013 | Bjorklund et al. | |
| 2014/0009390 A1 | 1/2014 | Bjorklund et al. | |
| 2014/0111420 A1 | 4/2014 | Ahn et al. | |
| 2014/0126782 A1* | 5/2014 | Takai | G06K 9/0061 382/116 |
| 2014/0146075 A1 | 5/2014 | Takasu | |
| 2014/0372944 A1* | 12/2014 | Mulcahy | G06F 3/04815 715/810 |
| 2015/0084840 A1* | 3/2015 | Kim | G02B 27/017 345/8 |
| 2016/0098093 A1* | 4/2016 | Cheon | G06F 3/0484 345/156 |
| 2016/0239081 A1 | 8/2016 | Imoto et al. | |
| 2017/0060370 A1 | 3/2017 | Ahn et al. | |

FOREIGN PATENT DOCUMENTS

| | | |
|---|---|---|
| JP | 2011-14081 A | 1/2011 |
| JP | 2014-86085 A | 5/2014 |
| JP | 2014-106445 A | 6/2014 |
| JP | 2014-191629 A | 10/2014 |
| WO | 2015/064165 A1 | 5/2015 |

* cited by examiner

FIG.18

| APPLICATION DETERMINATION TABLE BY MOVING STATE ||
|---|---|
| NON-MOVING STATE | PHONE APPLICATION<br>MAIL APPLICATION<br>MUSIC APPLICATION<br>⋮ |
| MOVING STATE | PHONE APPLICATION<br>MUSIC APPLICATION |

FIG.20

| EXECUTABLE FUNCTION DETERMINATION TABLE UPON MOVING ||| 
|---|---|---|
| APPLICATION TYPE | MOVING STATE | EXECUTABLE FUNCTION |
| MUSIC APPLICATION | WALKING | PLAY AND STOP, VOLUME CONTROL, SELECTION |
|  | OTHER THAN WALKING | PLAY AND STOP, VOLUME CONTROL |
| PHONE APPLICATION | WALKING | INCOMING CALL, OUTGOING CALL |
|  | OTHER THAN WALKING | INCOMING CALL |
| HEALTHCARE APPLICATION | WALKING | - |
|  | OTHER THAN WALKING | - |
| ⋮ | ⋮ | ⋮ |

WEARABLE DEVICE, CONTROL METHOD, AND CONTROL PROGRAM

RELATED APPLICATIONS

The present application is a National Phase of International Application Number PCT/JP2016/055521, filed Feb. 24, 2016, which claims priority to JP 2015-035908, filed Feb. 25, 2015 and JP 2015-090332, filed Apr. 27, 2015.

FIELD

The present application relates to a wearable device that can be worn on a user's head, a control method, and a control program.

BACKGROUND

A wearable device is known in which the wearable device includes a monitor display for displaying an icon image for user operation and a gaze position detecting unit for detecting a user's gaze position and receives an operation corresponding to the gaze position when the gaze position overlaps with the icon image displayed in the monitor display.

SUMMARY

Solution to Problem

A wearable device according to one aspect includes a display having a display area virtually divided into a first area and a second area. When a user's gaze position moves from the first area to the second area while an object corresponding to a predetermined function is displayed within the first area, the predetermined function is executed.

A control method according to one aspect executed by a wearable device including a display in which virtually divided first area and second area are set includes a step of executing a predetermined function when a user's gaze position moves from the first area to the second area while an object corresponding to the predetermined function is displayed within the first area.

A control program according to one aspect causes a wearable device including a display in which virtually divided first area and second area are set to execute a step of executing a predetermined function when a user's gaze position moves from the first area to the second area while an object corresponding to the predetermined function is displayed within the first area.

BRIEF DESCRIPTION OF DRAWINGS

FIG. 18 is a diagram illustrating an example of objects displayed in a first area according to the third embodiment.

FIG. 20 is a diagram illustrating an example of restriction of predetermined functions according to the third embodiment.

DETAILED DESCRIPTION

A plurality of embodiments for implementing a wearable device, a control method, and a control program according to the present application will be explained in detail below with reference to the accompanying drawings. In the following explanation, the same reference signs may be assigned to the same components. Moreover, overlapping explanation may be omitted. As is the wearable device, when an operation is received by the gaze position, an erroneous operation may occur due to an unintended gaze movement. From the above, it is necessary to prevent an erroneous operation as much as possible in the wearable device operable by the gaze movement.

First Embodiment

Figure 1:
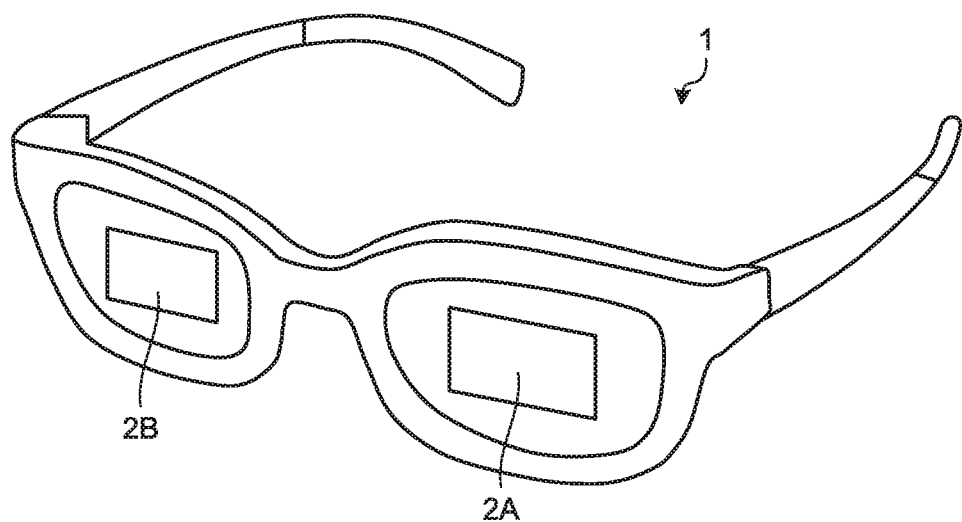
FIG. 1 is a diagram illustrating an example of an appearance configuration of a wearable device according to a first embodiment.

FIG. 1 is a diagram illustrating an example of an appearance configuration of a wearable device according to a first embodiment. As illustrated in FIG. 1, a wearable device 1 according to the first embodiment has an eyeglass structure that can be worn on a user's head. The wearable device 1 includes a pair of display 2A and display 2B on which images, videos, or the like are displayed. An example in which the wearable device 1 includes a display will be explained below, however, a configuration may be adopted in which a half mirror is installed instead of the display and an image irradiated from a projector is projected. The wearable device 1 mounts function units and detectors illustrated in FIG. 2 at appropriate positions.

Figure 2:
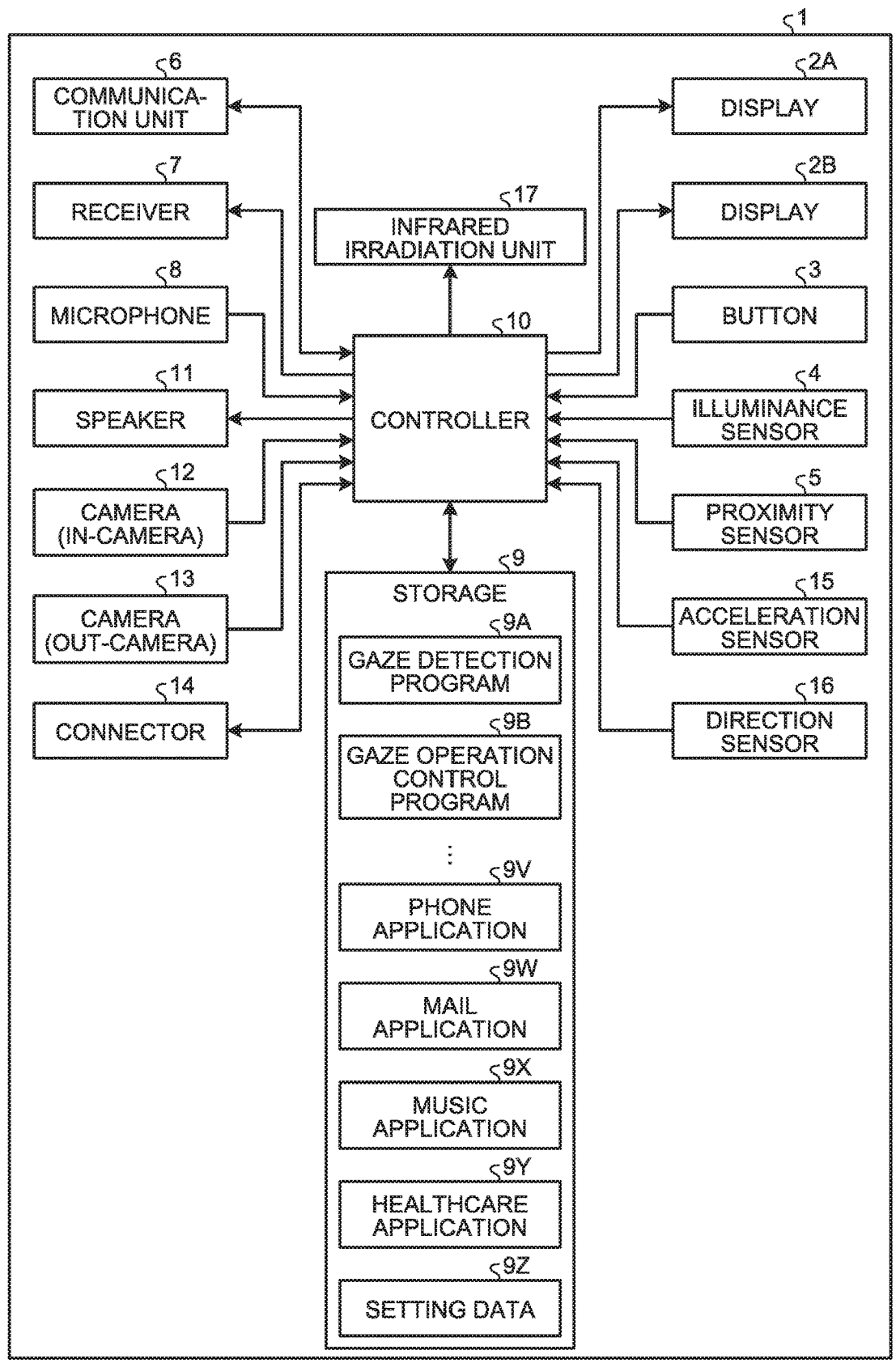
FIG. 2 is a block diagram illustrating a functional configuration of the wearable device according to the first embodiment.

FIG. 2 is a block diagram illustrating a functional configuration of the wearable device according to the first embodiment. As illustrated in FIG. 2, the wearable device 1 includes the display 2A and the display 2B, a button 3, an illuminance sensor 4, a proximity sensor 5, a communication unit 6, a receiver 7, a microphone 8, a storage 9, a controller 10, a speaker 11, a camera 12, a camera 13, a connector 14, an acceleration sensor 15, a direction sensor 16, and an infrared irradiation unit 17.

Each of the display 2A and the display 2B includes a display device such as an LCD (Liquid Crystal Display), an OELD (Organic Electro-Luminescence Display), or an IELD (Inorganic Electro-Luminescence Display). The display displays texts, images, symbols, graphics, and the like. The display 2A and the display 2B are examples of the display.

Figure 3:
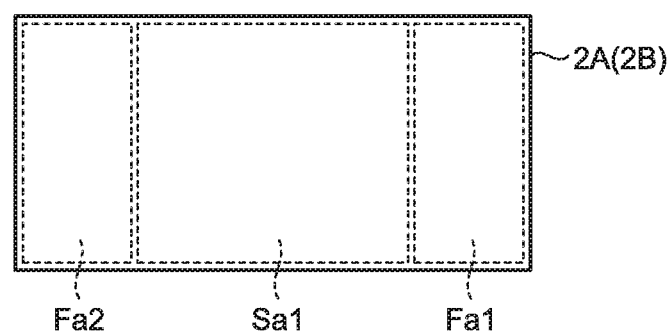
FIG. 3 is a diagram illustrating an example of a display area of a display according to the first embodiment.

FIG. 3 is a diagram illustrating an example of a display area of the display according to the first embodiment. Each display area of the display 2A and the display 2B is virtually divided into a plurality of areas in advance in order for processing performed by the controller 10. In the first embodiment, as illustrated in FIG. 3, each display area of the display 2A and the display 2B (hereinafter, described as "display" when necessary) is divided into three areas of a first area Fa1, a first area Fa2, and a second area Sa1. The first area Fa1 and the first area Fa2 display an object such as an icon operated by the user and an object such as a message and a widget used to notify the user of information. The second area Sa1 displays an execution screen etc. of a predetermined function associated with an image or an object.

The button 3 receives an operation input from the user. The number of buttons 3 may be singular or plural.

The illuminance sensor 4 detects the illuminance. The illuminance is a value of luminous flux incident on the unit area of a measurement surface of the illuminance sensor 4. The illuminance sensor 4 is used, for example, to adjust the luminance of the display.

The proximity sensor 5 detects the presence of nearby objects in a non-contact manner. The proximity sensor 5 detects the presence of the object based on a change in the magnetic field or a change in the return time of the reflected ultrasonic wave, etc. The proximity sensor 5 detects that, for example, the display and the face are brought close to each other. The illuminance sensor 4 and the proximity sensor 5 may be configured as one sensor. The illuminance sensor 4 can be used as the proximity sensor.

The communication unit 6 performs wireless communication. A wireless communication standard supported by the communication unit 6 includes, for example, a cellular-phone communication standard such as 2G, 3G, and 4G, and a short-distance wireless communication standard. The cellular-phone communication standard includes, for example, LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System). The short-distance wireless communication standard includes, for example, IEEE 802.11, Bluetooth (registered trademark), IrDA (Infrared Data Association), NFC (Near Field Communication), and WPAN (Wireless Personal Area Network). A WPAN communication standard includes, for example, ZigBee (registered trademark). The communication unit 6 may support one or more of the communication standards.

The receiver 7 is a sound output unit, and outputs a sound signal transmitted from the controller 10 as sound. The receiver 7 is used to output, for example, sound of a moving image, sound of music, and voice of a partner at the time of talking on the phone, which are reproduced by the wearable device 1. The microphone 8 is a sound input unit and converts the voice of the user or the like to a sound signal and transmits the sound signal to the controller 10.

The storage 9 stores programs and data. The storage 9 is used also as a work area that temporarily stores a processing result of the controller 10. The storage 9 may include any non-transitory storage medium such as a semiconductor storage medium and a magnetic storage medium. The storage 9 may include a plurality of types of storage mediums. The storage 9 may include a combination of a storage medium such as a memory card, an optical disk, or a magneto-optical disk with a reading device of the storage medium. The storage 9 may include a storage device used as a temporary storage area such as RAM (Random Access Memory).

Programs stored in the storage 9 include applications executed in the foreground or the background and a control program (not illustrated) for assisting operations of the applications. For example, a screen for the application executed in the foreground is displayed on the display 2A. The control program includes, for example, an OS. The applications and the basic programs may be installed in the storage 9 through wireless communication by the communication unit 6 or through a non-transitory storage medium.

The storage 9 stores a gaze detection program 9A, a gaze operation control program 9B, a phone application 9V, a mail application 9W, a music application 9X, a healthcare application 9Y, setting data 9Z, and the like.

The gaze detection program 9A provides a function for detecting a user's gaze position on the display and a user's gaze movement on the display. The gaze position corresponds to the position on the display when a gaze linearly extending starting from the center position of a pupil in an eyeball of the user intersects the display. The gaze movement corresponds to the movement of the gaze position on the display.

The gaze detection program 9A detects the gaze position and the gaze movement in the following manner. That is, the gaze detection program 9A detects the gaze position by applying an algorism based on a corneal reflection method to a user's image. Specifically, the gaze detection program 9A causes the infrared irradiation unit 17 to emit infrared rays when the user's image is to be acquired. The gaze detection program 9A respectively specifies the position of the pupil and the position of corneal reflection of the infrared rays from the acquired user's image. The gaze detection program 9A specifies the user's gaze direction based on the positional relationship between the position of the pupil and the position of corneal reflection of the infrared rays. When the position of the pupil is on the side of the corner of the eye rather than the corneal reflection position, the gaze detection program 9A determines that the gaze direction is the side of the corner of the eye, and determines, when the position of the pupil is on the side of the inner corner of the eye rather than the corneal reflection position, that the gaze direction is the side of the inner corner of the eye. The gaze detection program 9A calculates a distance between the eyeball of the user and the display based on, for example, the size of the iris. The gaze detection program 9A detects the gaze position which is a position on the display when the gaze starting at the pupil intersects the display, from the center position of the pupil in the eyeball of the user based on the user's gaze direction and the distance between the user's eyeball and the display. Then, the gaze detection program 9A detects the user's gaze movement by recursively executing the detection of the gaze position.

Although the example has explained that the gaze detection program 9A detects the user's gaze position by executing the processing using the corneal reflection method, the embodiments are not limited to the example. For example, it may be configured that the gaze detection program 9A detects the gaze position by executing image recognition processing for the user's image. For example, the gaze detection program 9A extracts a predetermined area including the user's eyeball from the user's image, and specifies the gaze direction based on the positional relationship between the inner corner of the eye and the iris. The gaze detection program 9A detects the gaze position based on the specified gaze direction and the distance from the user's eyeball to the display. Alternatively, the gaze detection program 9A stores a plurality of eyeball images as reference images when the user is browsing parts of the display area on the display. The gaze detection program 9A then detects the gaze position by matching the image of the user's eyeball acquired as a target to be determined to the reference images.

The gaze operation control program 9B provides a function for controlling various types of processing related to an object corresponding to a predetermined function based on the detection results of the gaze position and the gaze movement. Specifically, when the gaze position is detected within the first area Fa1 while the object corresponding to the predetermined function is displayed within the first area Fa1, the gaze operation control program 9B sets the object displayed within the first area Fa1 to a selection state based on the detected gaze position. Then, when the gaze movement from the first area Fa1 to the second area Sa1 is detected while the object is selected, the gaze operation control program 9B performs the predetermined function. The gaze operation control program 9B performs the same processing even when the object corresponding to the predetermined function is displayed within the first area Fa2. In other words, when the gaze position is detected within the first area Fa2 while the object corresponding to the predetermined function is displayed within the first area Fa2, the gaze operation control program 9B sets the object displayed within the first area Fa2 to the selection state based on the detected gaze position. Then, when the gaze movement from the first area Fa2 to the second area Sa1 is detected while the object is selected, the gaze operation control program 9B performs the predetermined function.

The gaze operation control program 9B can also cause the execution screen of the predetermined function to be displayed in the second area Sa1 with the execution of the predetermined function corresponding to the object.

The gaze operation control program 9B can also cause the object to be previously displayed in the first area Fa1 or the first area Fa2.

The gaze operation control program 9B can also cause the object to be displayed in the first area Fa1 when the gaze movement from the second area Sa1 to the first area Fa1 is detected. That is, the gaze operation control program 9B can adopt the detection of the gaze movement from the second area to the first area as object display conditions. Likewise, the gaze operation control program 9B can also cause the object to be displayed in the first area Fa2 when the gaze movement from the second area Sa1 to the first area Fa2 is detected.

When the state in which the gaze position is detected within the first area Fa1 continues for a predetermined period of time or more, the gaze operation control program 9B can also cause the object to be displayed in the first area Fa1. That is, the gaze operation control program 9B can adopt the staying time of the gaze position in the first area as the object display conditions. Likewise, when the state in which the gaze position is detected within the first area Fa2 continues for a predetermined period of time or more, the gaze operation control program 9B can also cause the object to be displayed in the first area Fa2.

The gaze operation control program 9B can also cause images indicating gaze positions to be displayed in the first area Fa1, the first area Fa2, and in the second area Sa1.

When a plurality of objects are displayed in the first area Fa1, the gaze operation control program 9B can also set an object, of which display position and the user's gaze position overlap with each other in the first area Fa1, to the selection state capable of executing the predetermined function corresponding to the object. Likewise, when a plurality of objects are displayed in the first area Fa2, the gaze operation control program 9B can also set an object, of which display position and the user's gaze position overlap with each other in the first area Fa2, to the selection state capable of executing the predetermined function corresponding to the object.

The gaze operation control program 9B can also set a release area for releasing selection of an object within the first area Fa1 and release the selection of the object when the gaze position is detected within the release area. Likewise, the gaze operation control program 9B can also set a release area for releasing selection of an object within the first area Fa2 and release the selection of the object when the gaze position is detected within the release area.

When a gaze movement from the first area Fa1 to the second area Sa1 is not detected within a predetermined period of time while the object displayed in the first area Fa1 is selected, the gaze operation control program 9B can also release the selection of the object. Likewise, when a gaze movement from the first area Fa2 to the second area Sa1 is not detected within a predetermined period of time while the object displayed in the first area Fa2 is selected, the gaze operation control program 9B can also release the selection of the object.

The phone application 9V provides a phone call function for phone calls through wireless communication. The mail application 9W provides an email function for composition, transmission, reception, display, and the like of emails. The music application 9X provides a function for reproduction or the like of music data. The healthcare application 9Y provides a function for management or the like of user data related to health.

The setting data 9Z is configured to include various data used for processing executed based on the function provided by the gaze detection program 9A etc. and used for processing executed based on the function provided by the gaze operation control program 9B etc. The setting data 9Z includes information on the display conditions of objects. For example, the information on objects to be displayed in advance is included in the first area Fa1 or in the first area Fa2. For example, when an object is to be displayed in advance, the setting data 9Z includes information for which of the first area Fa1 and the first area Fa2 the object is displayed in.

The controller 10 is a processor. Examples of the processor include, but are not limited to, a CPU (Central Processing Unit), an SoC (System-on-a-Chip), an MCU (Micro Control Unit), an FPGA (Field-Programmable Gate Array), and a coprocessor. The controller 10 can integrally control the operations of the wearable device 1 to implement various functions. The controller 10 is an example of a control unit.

Specifically, the controller 10 can execute instructions included in the program stored in the storage 9 while referring to data stored in the storage 9 as necessary. The controller 10 can then control function units according to the data and the instructions to thereby implement the various functions. Examples of the function units include, but are not limited to, the display 2A and the display 2B, the communication unit 6, the microphone 8, the speaker 11, and the infrared irradiation unit 17. The controller 10 can change the control according to a detection result of a detector. Examples of the detector include, but are not limited to, the display 2B, the button 3, the illuminance sensor 4, the proximity sensor 5, the microphone 8, the camera 12, the camera 13, the acceleration sensor 15, and the direction sensor 16.

The controller 10 can execute the gaze detection program 9A, and thereby perform the processing for detecting the user's gaze position on the display and the user's gaze movement on the display.

The controller 10 can execute the gaze operation control program 9B, and thereby perform next processing. In other words, when the gaze position is detected within the first area Fa1 while the object corresponding to the predetermined function is displayed within the first area Fa1, the controller 10 can set the object to the selection state based on the detected gaze position. Then, when the gaze movement from the first area Fa1 to the second area Sa1 is detected while the object is selected, the gaze operation control program 9B performs the predetermined function. Likewise, when the gaze position is detected within the first area Fa2 while the object corresponding to the predetermined function is displayed within the first area Fa2, the controller 10 can set the object displayed within the first area Fa2 to the selection state based on the detected gaze position. Then, when the gaze movement from the first area Fa2 to the second area Sa1 is detected while the object is selected, the controller 10 can execute the predetermined function.

By executing the gaze operation control program 9B, the controller 10 can also perform processing for displaying the execution screen of a predetermined function in the second area Sa1 with the execution of the predetermined function corresponding to the object.

By executing the gaze operation control program 9B, the controller 10 can also perform processing for displaying an object in the first area Fa1 or in the first area Fa2 in advance.

By executing the gaze operation control program 9B, the controller 10 can also cause the object to be displayed in the first area Fa1 when the gaze movement from the second area Sa1 to the first area Fa1 is detected. That is, the controller 10 can adopt the detection of the gaze movement from the second area to the first area as the object display conditions. Likewise, the controller 10 can also cause the object to be displayed in the first area Fa2 when the gaze movement from the second area Sa1 to the first area Fa2 is detected.

By executing the gaze operation control program 9B, the controller 10 can also cause the object to be displayed in the first area Fa1 when the state in which the gaze position is detected within the first area Fa1 continues for a predetermined period of time or more. That is, the controller 10 can adopt the staying time of the gaze position in the first area as the object display conditions. Likewise, when the state in which the gaze position is detected within the first area Fa2 continues for a predetermined period of time or more, the controller 10 can also cause the object to be displayed in the first area Fa2.

By executing the gaze operation control program 9B, the controller 10 can also cause images indicating gaze positions to be displayed in the first area Fa1, the first area Fa2, and in the second area Sa1.

By executing the gaze operation control program 9B, when the objects are displayed in the first area Fa1, the controller 10 can also set an object, of which display position and the user's gaze position overlap with each other in the first area Fa1, to the selection state capable of executing the predetermined function corresponding to the object in the first area Fa1. Likewise, when the objects are displayed in the first area Fa2, the controller 10 can also set an object, of which display position and the user's gaze position overlap with each other, to the selection state capable of executing the predetermined function corresponding to the object in the first area Fa2.

By executing the gaze operation control program 9B, the controller 10 can also set a release area for releasing selection of an object within the first area Fa1 and release the selection of the object when the gaze position is detected within the release area. Likewise, the controller 10 can also set a release area for releasing selection of an object within the first area Fa2 and release the selection of the object when the gaze position is detected within the release area.

By executing the gaze operation control program 9B, when a gaze movement from the first area Fa1 to the second area Sa1 is not detected within the predetermined period of time while the object displayed in the first area Fa1 is selected, the controller 10 can also release the selection of the object. Likewise, when a gaze movement from the first area Fa2 to the second area Sa1 is not detected within the predetermined period of time while the object displayed in the first area Fa2 is selected, the controller 10 can also release the selection of the object.

The speaker 11 is a sound output unit. The speaker 11 outputs a sound signal transmitted from the controller 10 as sound. The speaker 11 is used to output, for example, a ring tone and music. Either one of the receiver 7 and the speaker 11 may have the other function.

The camera 12 and the camera 13 convert a captured image to an electric signal. The camera 12 is an in-camera for capturing an object facing the display 2A. The camera 12 captures, for example, an image of the eyeball of the user wearing the wearable device 1. The camera 13 is an out-camera for capturing an external subject facing the opposite side of the display 2A. The camera 13 captures, for example, an external subject present in the gaze direction of the user wearing the wearable device 1. The camera 12 and the camera 13 may be mounted on the wearable device 1 in a state in which both of them are functionally and physically integrated as a camera unit that can be used by switching between the in-camera and the out-camera.

The connector 14 is a terminal to which other device is connected. The connector 14 may be a general-purpose terminal such as a USB (Universal Serial Bus), an HDMI (registered trademark) (High-Definition Multimedia Interface), Light Peak (Thunderbolt (registered trademark)), and an earphone/microphone connector. The connector 14 may be a dedicated terminal such as a dock connector. Examples of the device connected to the connector 14 include, but are not limited to, an external storage, a speaker, and a communication device.

The acceleration sensor 15 detects a direction and a magnitude of acceleration acting on the wearable device 1. The direction sensor 16 detects, for example, the direction of geomagnetism, and detects the direction (orientation) of the wearable device 1 based on the direction of the geomagnetism.

The wearable device 1 may include a GPS receiver and a vibrator in addition to the function units. The GPS receiver supports calculation processing of the current position of the wearable device 1 by receiving a radio signal of a predetermined frequency band from a GPS satellite, performing demodulation processing on the received radio signal, and transmitting the processed signal to the controller 10. The vibrator vibrates part or whole of the wearable device 1. The vibrator includes, for example, a piezoelectric element or an eccentric motor in order to generate vibration. Although not illustrated in FIG. 2, function units, such as a battery, which should be used to maintain the functions of the wearable device 1 and a controller which should be used to implement the control of the wearable device 1 are mounted on the wearable device 1.

An overview of processing executed by the wearable device according to the first embodiment will be explained below with reference to FIG. 4 to FIG. 8. FIG. 4 to FIG. 8 are diagrams illustrating the overview of the processing executed by the wearable device according to the first embodiment.

Figure 4:
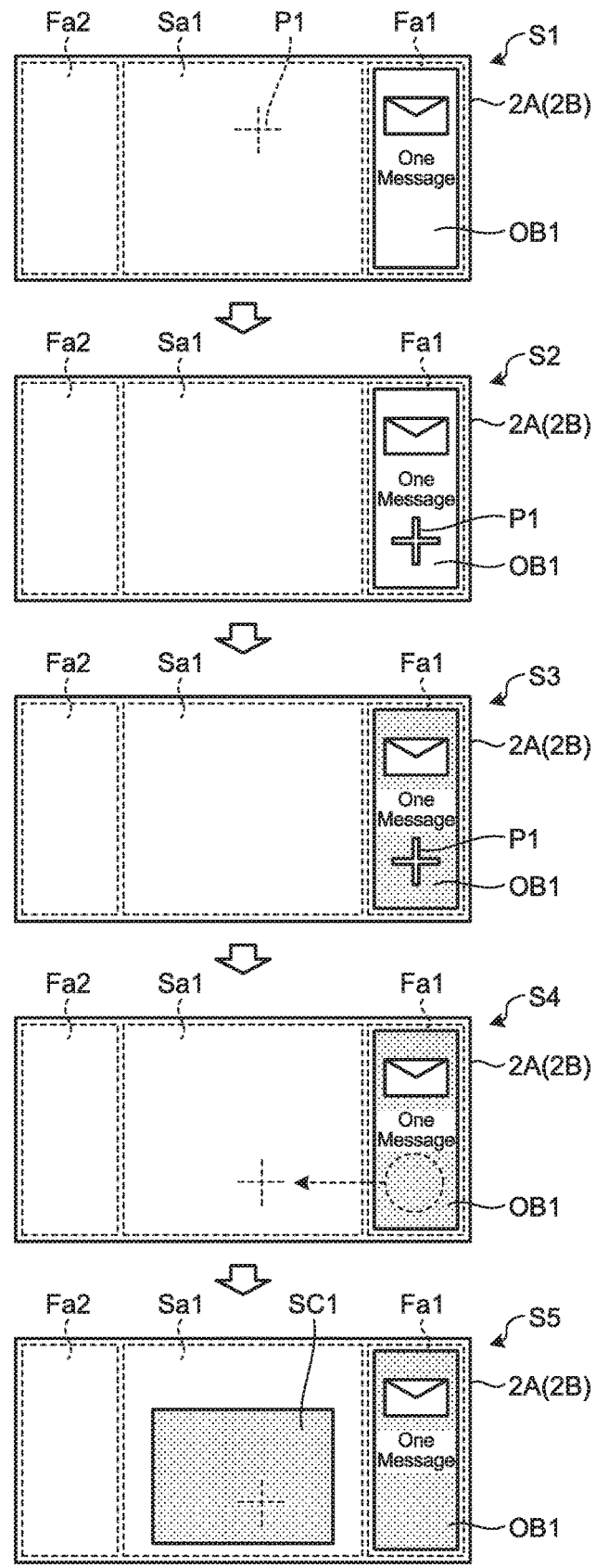
FIG. 4 is a diagram illustrating an overview of processing executed by the wearable device according to the first embodiment.

FIG. 4 illustrates the overview of the processing for executing the predetermined function corresponding to the object displayed in the first area based on the gaze movement of the user performed by the wearable device 1. As illustrated in FIG. 4, when a user's gaze position in the first area Fa1 is detected while an object OB1 for notifying the user of reception of an electronic mail or a message is displayed in the first area Fa1 of the display (Step S1), the wearable device 1 causes an image P1 indicating the user's gaze position to be displayed in the first area Fa1 (Step S2).

Subsequently, by detecting the user's gaze position in the first area Fa1, the wearable device 1 sets the object OB1 to the selection state capable of executing the predetermined function corresponding to the object OB1 (Step S3). At this time, in order to make it easy to understand that the object OB1 is in the selection state, the wearable device 1 changes the display status of the object OB1. However, the wearable device 1 does not have to change the display status of the object OB1 when it becomes the selection state capable of executing the predetermined function corresponding to the object OB1.

Subsequently, when the gaze movement from the first area Fa1 to the second area Sa1 is detected while the object OB1 is selected (Step S4), the wearable device 1 executes the predetermined function corresponding to the object OB1 and causes an execution screen SC1 for the predetermined function to be displayed in the second area Sa1 (Step S5). Step S5 of FIG. 4 indicates an example of executing the mail application 9W as the predetermined function corresponding to the object and displaying the screen of the mail application 9W.

In the processing illustrated in FIG. 4, the example has been explained in which by detecting the user's gaze position in the first area Fa1, the wearable device 1 sets the object OB1 to the selection state capable of executing the predetermined function corresponding to the object OB1, however, the embodiments are not limited to the example. For example, the wearable device 1 may set the object OB1 to the selection state on condition that the state in which the user's gaze position is detected within the first area Fa1 continues for a predetermined period of time or more. In the processing illustrated in FIG. 4, the example has been explained in which the wearable device 1 causes the image P1 indicating the user's gaze position to be displayed when the user's gaze position is detected in the first area Fa1, however, the embodiments are not limited to the example. For example, regarding the second area Fa2, the wearable device 1 may be configured to cause the image P1 to be displayed in the second area Fa2 on condition that the user's gaze position is detected, and regarding the first area Fa1, the wearable device 1 may be configured to cause the image P1 to be displayed in the first area Fa1 on condition that a predetermined period of time elapses since the display of the object OB1.

Figure 5:
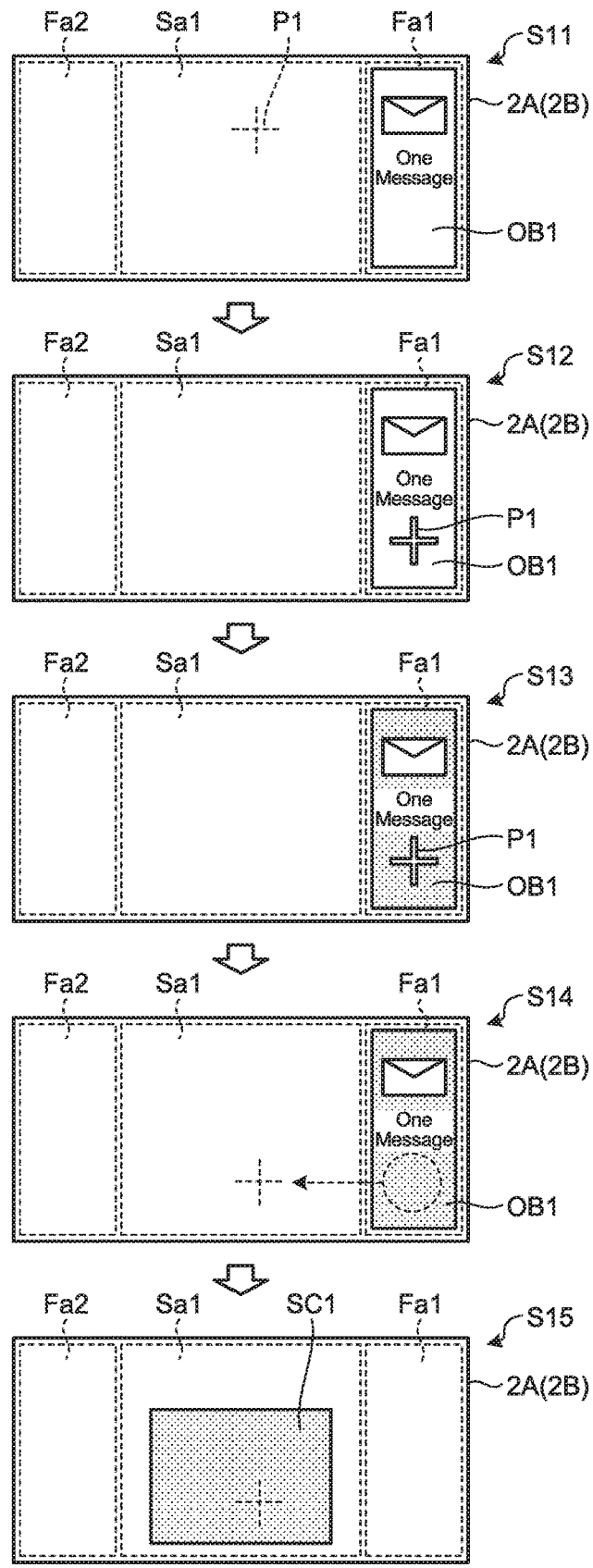
FIG. 5 is a diagram illustrating an overview of processing executed by the wearable device according to the first embodiment.

FIG. 5 illustrates other example of the processing illustrated in FIG. 4. Among processes at Step S11 to Step S15 illustrated in FIG. 5, the process illustrated at Step S15 is different from that of FIG. 4. In other words, as illustrated in FIG. 5, when the gaze movement from the first area Fa1 to the second area Sa1 is detected while the object OB1 is selected (Step S14), the wearable device 1 executes the predetermined function corresponding to the object OB1 and causes the execution screen SC1 for the predetermined function to be displayed in the second area Sa1 (Step S15). The wearable device 1 deletes the object OB1 displayed in the first area Fa1 with the execution of the predetermined function corresponding to the object OB1 (also Step S15). In this way, the user is more likely to recognize the execution of the predetermined function corresponding to the object.

Figure 6:
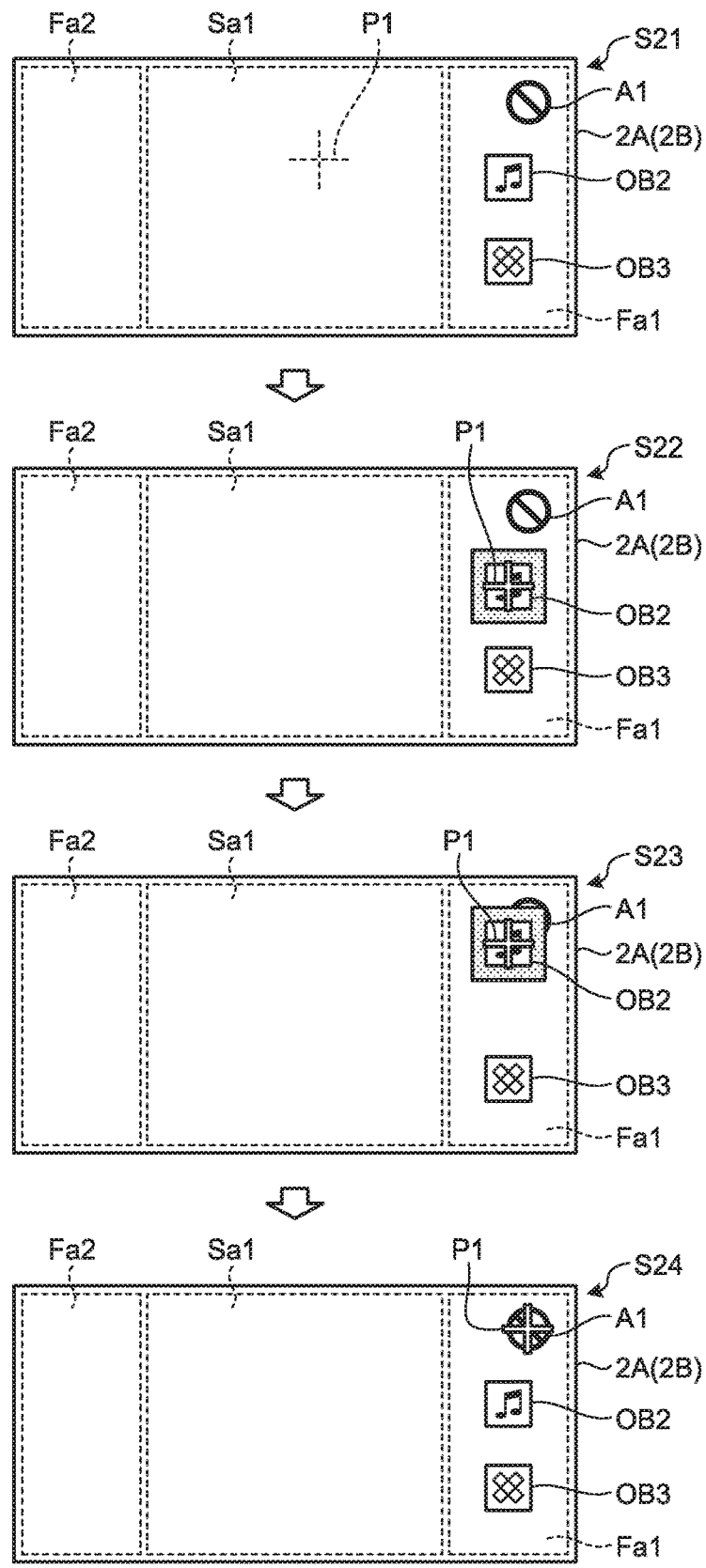
FIG. 6 is a diagram illustrating an overview of processing executed by the wearable device according to the first embodiment.

FIG. 6 illustrates an overview of processing for releasing the selection of an object performed by the wearable device 1. As illustrated in FIG. 6, the wearable device 1 causes a release area A1 for releasing selection of an object to be set within the first area Fa1 and to be displayed (Step S21).

When the user's gaze position in the first area Fa1 is detected while an object OB2 which is an icon corresponding to the music application 9X and an object OB3 which is an icon corresponding to the healthcare application 9Y are displayed in the first area Fa1 (Step S21), the wearable device 1 causes the image P1 indicating the user's gaze position to be displayed in the first area Fa1 (Step S22).

Subsequently, in the first area Fa1, the wearable device 1 sets the object OB2, of which display position and the user's gaze position overlap with each other, to the selection state capable of executing the predetermined function corresponding to the object OB2 (Step S22). At this time, in order to make it easy to understand that the object OB2 is in the selection state, the wearable device 1 changes the display status of the object OB2.

Subsequently, when detecting the gaze position within the release area A1 (Step S23), the wearable device 1 releases the selection of the object OB2 (Step S24). At this time, in order to make it easy to understand that the selection state of the object OB2 is released, the wearable device 1 returns the display position and the display status of the object OB2 to the position and the status illustrated at Step S21.

In the processing illustrated in FIG. 6, the wearable device 1 may set the release area A1 for releasing selection of the object within the first area Fa2. In the processing illustrated in FIG. 6, the example has been explained in which the wearable device 1 releases the selection of the object OB2 when the gaze position is detected within the release area A1, however, the embodiments are not limited to the example. For example, when a predetermined period of time elapses without detection of the gaze movement from the first area Fa1 to the second area Sa1 after the setting of the object OB2 to the selection state, the wearable device 1 may release selection of the object OB2. In addition, for example, as illustrated in FIG. 6, the wearable device 1 may release selection of the object OB2 when the object OB2 and the object OB3 are displayed in a vertical direction (longitudinal direction) with respect to a direction (lateral direction) in which the first area Fa1 and the second area Fa2 are arranged and the gaze movement in the longitudinal direction is detected after the setting of the object OB2 to the selection state.

Figure 7:
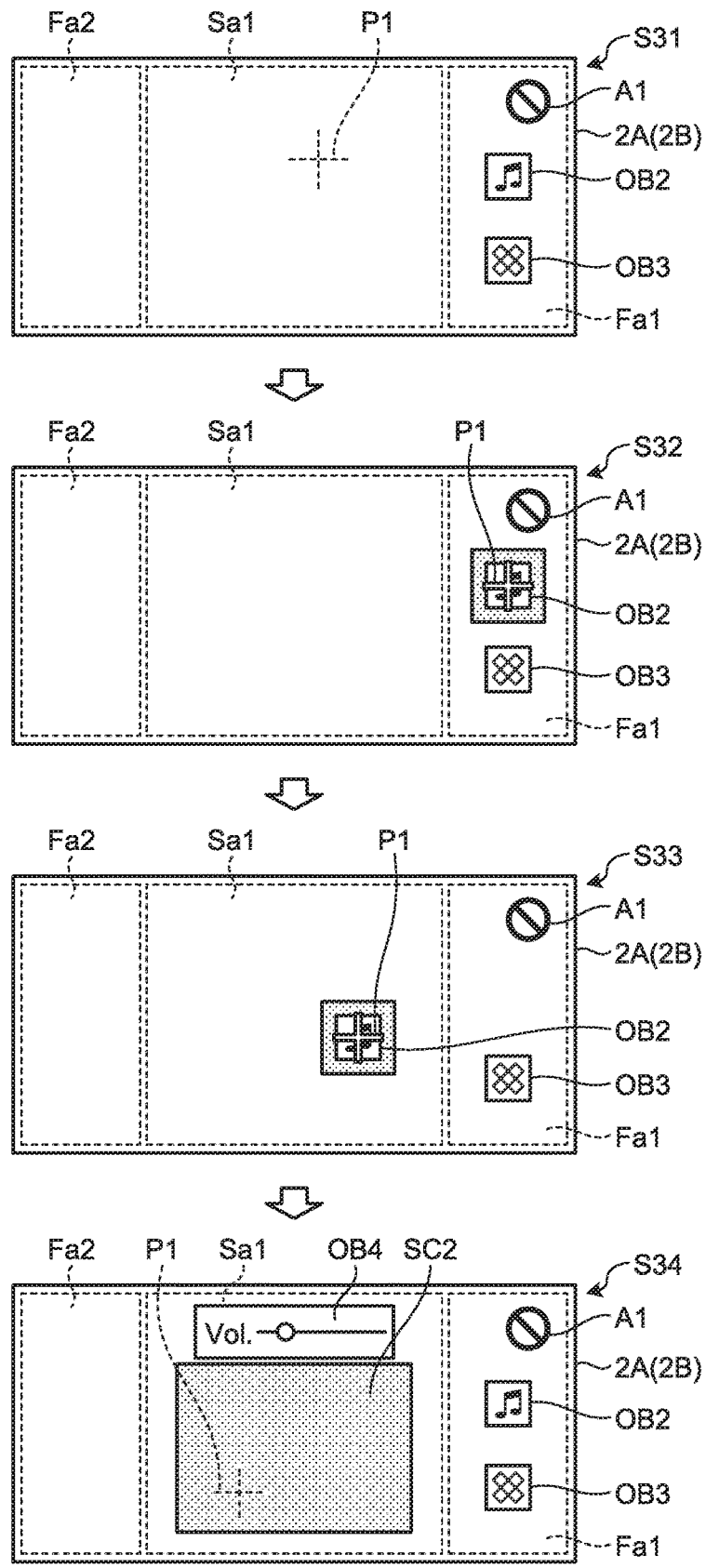
FIG. 7 is a diagram illustrating an overview of processing executed by the wearable device according to the first embodiment.

FIG. 7 illustrates an overview of processing of displaying an object related to a predetermined function with the execution of the predetermined function performed by the wearable device 1. As illustrated in FIG. 7, when the user's gaze position in the first area Fa1 is detected while the object OB2 and the object OB3 are displayed in the first area Fa1 (Step S31), the wearable device 1 causes the image P1 indicating the user's gaze position to be displayed in the first area Fa1 (Step S32).

Subsequently, the wearable device 1 sets the object OB2, of which display position and the user's gaze position overlap with each other in the first area Fa1, to the selection state capable of executing the predetermined function corresponding to the object OB2 (Step S32). At this time, in order to make it easy to understand that the object OB2 is in the selection state, the wearable device 1 changes the display status of the object OB2.

Subsequently, when the gaze movement from the first area Fa1 to the second area Sa1 is detected while the object OB2 is selected (Step S33), the wearable device 1 executes the predetermined function corresponding to the object OB2 and causes an execution screen SC2 for the predetermined function to be displayed in the second area Sa1 (Step S34). Step S34 of FIG. 7 indicates an example in which the music application 9X is executed and the screen of the music application 9X is displayed. At Step S34, when a gaze operable object OB4 is included in the predetermined function to be executed, the wearable device 1 causes the object OB4 to be displayed at a position that does not overlap with the gaze position in the second area Sa1. FIG. 7 illustrates an example of displaying an object for performing volume control as the gaze operable object OB4 included in the music application 9X.

In the example illustrated in FIG. 7, the wearable device 1 may delete the display of the object OB2 which is the icon corresponding to the music application 9X from the first area Fa1 upon executing the music application 9X. In the example illustrated in FIG. 7, the wearable device 1 may cause the object OB2 which is the icon corresponding to the music application 9X to be re-displayed in the first area Fa1 with the end of the music application 9X. Although FIG. 7 illustrates the example in which the wearable device 1 moves the selected object OB2 following the gaze movement, the object OB2 does not have to be moved.

In the processing illustrated in FIG. 7, the example has been explained in which the wearable device 1 sets the object OB2, of which display position and the user's gaze position overlap with each other in the first area Fa1, to the selection state capable of executing the predetermined function corresponding to the object OB2, however, the embodiments are not limited to the example. For example, the wearable device 1 may set the object OB2 to the selection state on condition that the state in which the user's gaze position and the display position of the object OB2 overlap with each other in the first area Fa1 continues for a predetermined period of time or more.

The example illustrated in FIG. 7 indicates the example in which, when the gaze movement from the first area Fa1 to the second area Sa1 is detected while the object OB2 is selected, the wearable device 1 executes the predetermined function corresponding to the object OB2, however, the embodiments are not limited to the example. For example, when the gaze movement from the first area Fa1 to a position away from the first area Fa1 in the second area Sa1 by a predetermined distance or more is detected while the object OB2 is selected, the wearable device 1 may execute the predetermined function corresponding to the object OB2.

Figure 8:
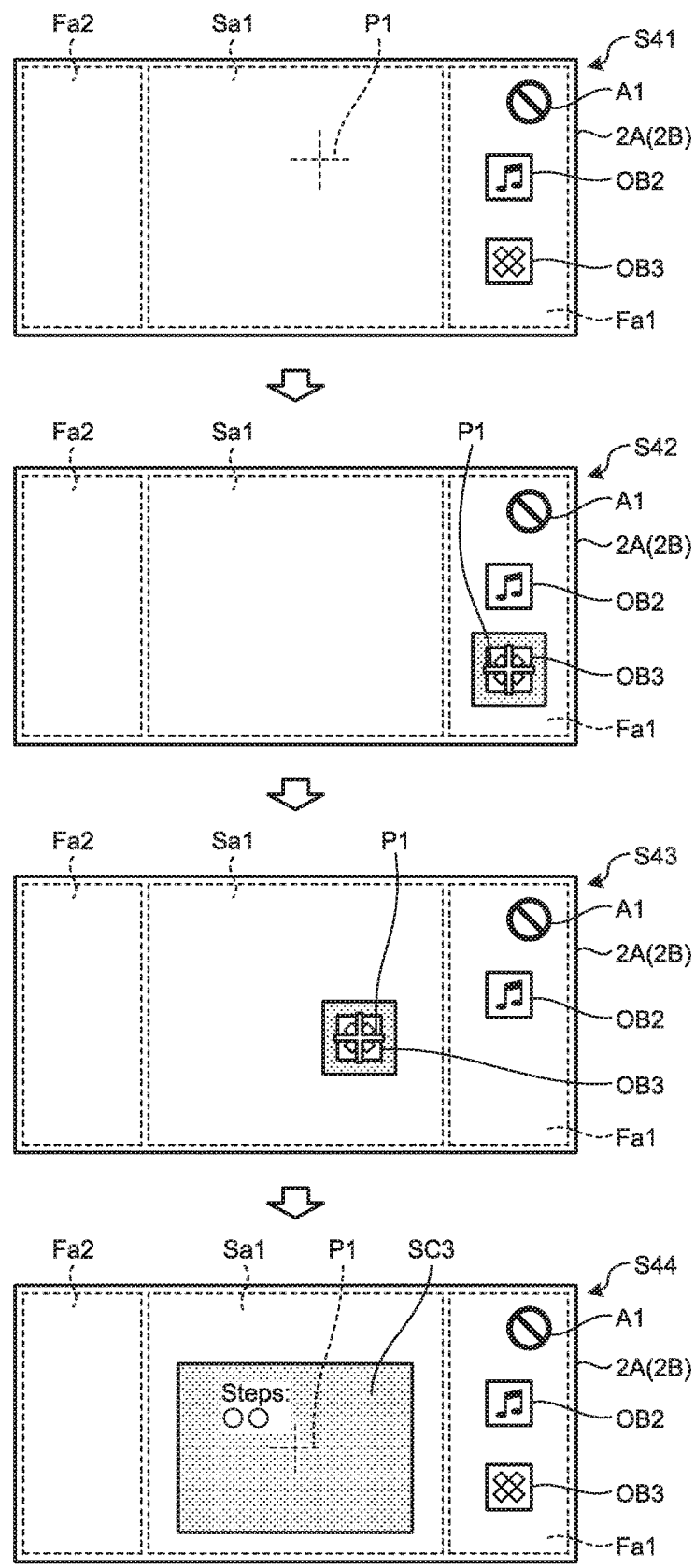
FIG. 8 is a diagram illustrating an overview of processing executed by the wearable device according to the first embodiment.

FIG. 8 illustrates an example different from that of FIG. 7 as an overview of processing of displaying an object related to a predetermined function with the execution of the predetermined function performed by the wearable device 1. As illustrated in FIG. 8, when the user's gaze position in the first area Fa1 is detected while the object OB2 and the object OB3 are displayed in the first area Fa1 (Step S41), the wearable device 1 causes the image P1 indicating the user's gaze position to be displayed in the first area Fa1 (Step S42).

Subsequently, the wearable device 1 sets the object OB3, of which display position and the user's gaze position overlap with each other in the first area Fa1, to the selection state capable of executing the predetermined function corresponding to the object OB3 (Step S42). At this time, in order to make it easy to understand that the object OB3 is in the selection state, the wearable device 1 changes the display status of the object OB3.

Subsequently, when the gaze movement from the first area Fa1 to the second area Sa1 is detected while the object OB3 is selected (Step S43), the wearable device 1 performs the predetermined function corresponding to the object OB3 and causes an execution screen SC3 for the predetermined function to be displayed in the second area Sa1 (Step S44). Step S44 of FIG. 8 indicates an example in which the healthcare application 9Y is executed and the screen of the healthcare application 9Y is displayed. When a gaze operable object is not included in the predetermined function to be executed, the wearable device 1 causes the execution screen SC3 to be displayed so as to overlap with the gaze position detected at least in the second area Sa1. For example, as illustrated at Step S44, the wearable device 1 may cause the execution screen SC3 to be displayed so that the gaze position detected in the second area Sa1 is located at the center.

In the example illustrated in FIG. 8, the wearable device 1 may delete the display of the object OB3 which is the icon corresponding to the healthcare application 9Y from the first area Fa1 upon executing the healthcare application 9Y. In the example illustrated in FIG. 8, the wearable device 1 may cause the object OB3 which is the icon corresponding to the healthcare application 9Y to be re-displayed in the first area Fa1 with the end of the healthcare application 9Y. Although FIG. 8 illustrates the example in which the wearable device 1 moves the selected object OB3 following the gaze movement, the object does not have to be moved.

Figure 9:
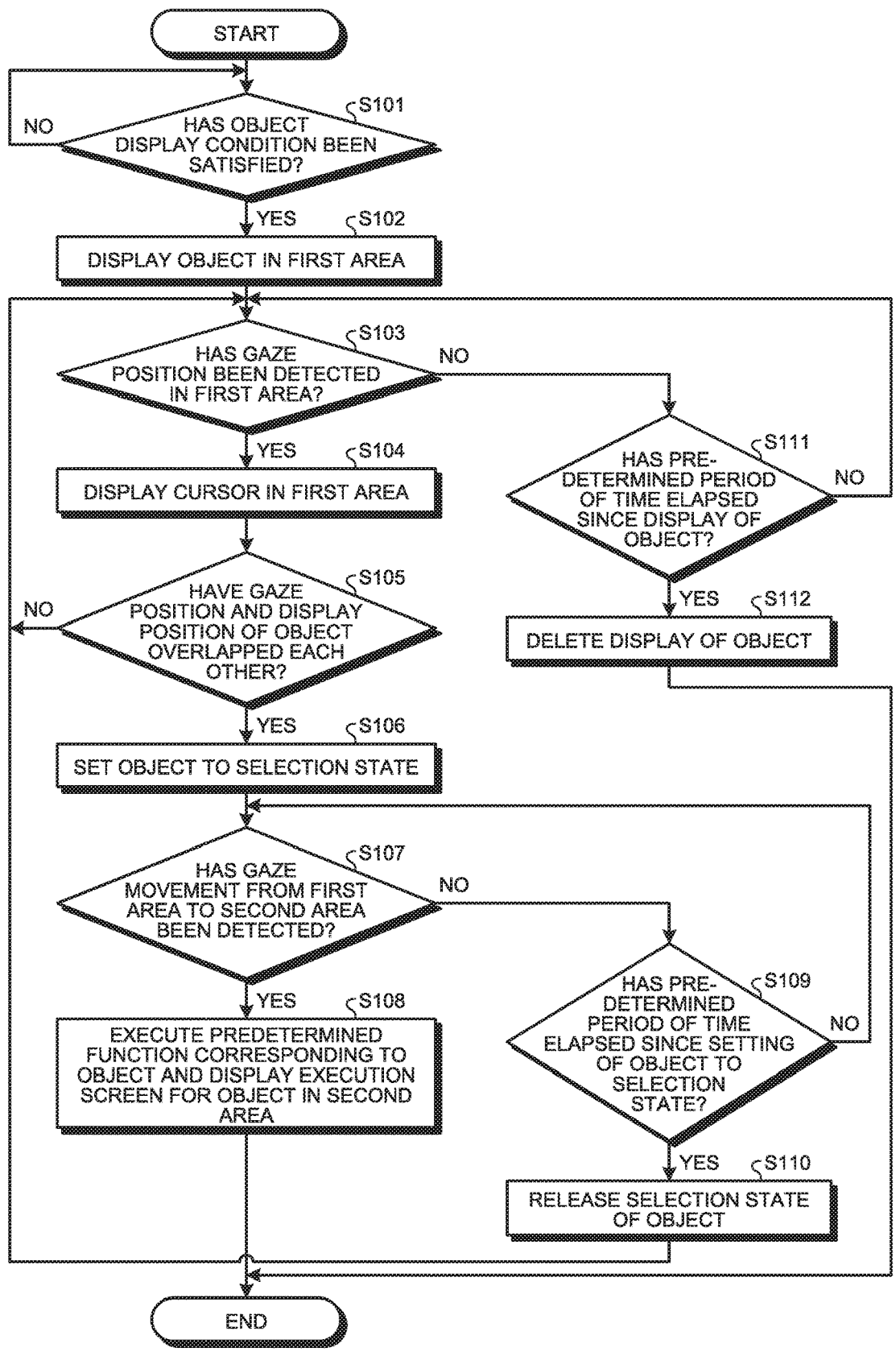
FIG. 9 is a flowchart illustrating a flow of the processing of the wearable device according to the first embodiment.
Figure 10:
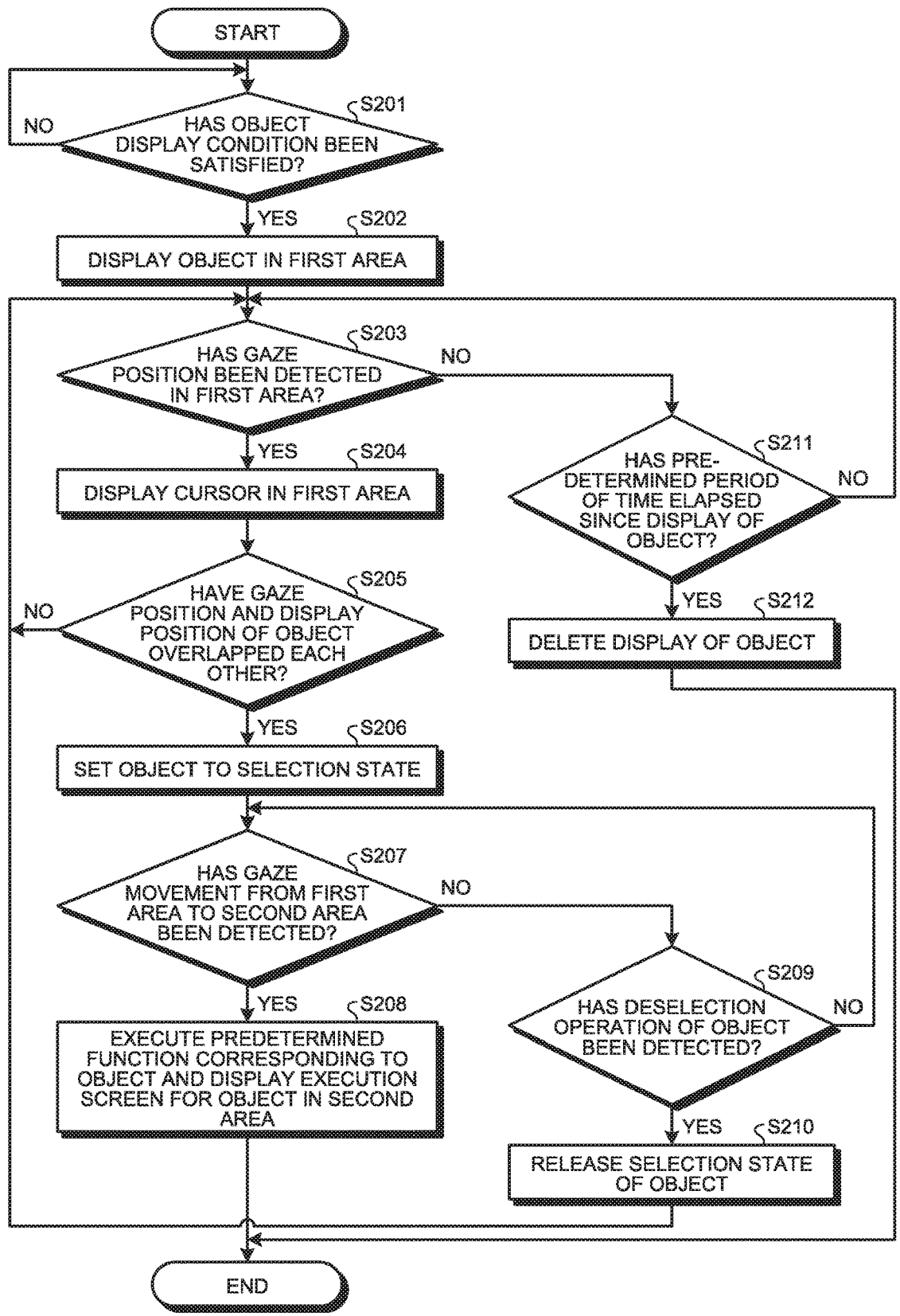
FIG. 10 is a flowchart illustrating a flow of the processing of the wearable device according to the first embodiment.

A flow of processing of the wearable device according to the first embodiment will be explained below with reference to FIG. 9 and FIG. 10. FIG. 9 and FIG. 10 are flowcharts each illustrating a flow of the processing of the wearable device according to the first embodiment. The processing illustrated in FIG. 9 and FIG. 10 is implemented by the controller 10 executing the gaze detection program 9A and the gaze operation control program 9B stored in the storage 9. "Object" appearing in the following explanation corresponds to the object OB1 to object OB3 illustrated in FIG. 4 to FIG. 8. "First area" appearing in the following explanation corresponds to the first area Fa1 or the first area Fa2 illustrated in FIG. 3, and "second area" corresponds to the second area Sa1 illustrated in FIG. 3. In addition, "cursor" appearing in the following explanation corresponds to the image P1 indicating the user's gaze position in FIG. 4 to FIG. 8.

As illustrated in FIG. 9, the controller 10 can determine whether an object display condition has been satisfied (Step S101).

When the object display condition has not been satisfied as a result of the determination (No at Step S101), the controller 10 can repeat the same determination. In contrast, when the object display condition has been satisfied (Yes at Step S101), the controller 10 can cause the object to be displayed in the first area (Step S102).

Subsequently, the controller 10 can determine whether the gaze position has been detected in the first area (Step S103).

When the gaze position has been detected in the first area as a result of the determination (Yes at Step S103), the controller 10 can cause the cursor to be displayed in the first area (Step S104).

Subsequently, the controller 10 can determine whether the gaze position and the display position of the object have overlapped with each other in the first area (Step S105).

When the gaze position and the display position of the object have overlapped with each other in the first area as a result of the determination (Yes at Step S105), the controller 10 can set the object to the selection state (Step S106).

Subsequently, the controller 10 can determine whether the gaze movement from the first area to the second area has been detected while the object is selected (Step S107).

When the gaze movement from the first area to the second area has been detected as a result of the determination (Yes at Step S107), the controller 10 can execute the predetermined function corresponding to the object, display an execution screen of the object in the second area (Step S108), and end the processing illustrated in FIG. 9.

At Step S107, when the gaze movement from the first area to the second area has not been detected as a result of the determination (No at Step S107), the controller 10 can determine whether a predetermined period of time has elapsed since the setting of the object to the selection state (Step S109).

When a predetermined period of time has not elapsed since the setting of the object to the selection state as a result of the determination (No at Step S109), the controller 10 can return to the procedure at Step S107. In contrast, when a predetermined period of time has elapsed since the setting of the object to the selection state as a result of the determination (Yes at Step S109), the controller 10 can release the selection state of the object (Step S110) and return to the procedure at Step S103.

At Step S105, when the gaze position and the display position of the object have not overlapped with each other in the first area as a result of the determination (No at Step S105), the controller 10 can return to the procedure at Step S103.

At Step S103, when the gaze position has not been detected in the first area as a result of the determination (No at Step S103), the controller 10 can determine whether a predetermined period of time has elapsed since the display of the object in the first area (Step S111).

When a predetermined period of time has not elapsed since the display of the object in the first area as a result of the determination (No at Step S111), the controller 10 can return to the procedure at Step S103. In contrast, when a predetermined period of time has elapsed since the display of the object in the first area as a result of the determination (Yes at Step S111), the controller 10 can delete the display of the object from the first area (Step S112), and end the processing illustrated in FIG. 9.

In the flow of the processing illustrated in FIG. 10, the procedure at Step S209 illustrated in FIG. 10 is different from the flow of the processing illustrated in FIG. 9. In other words, it is determined whether the gaze movement from the first area to the second area has been detected while the object is selected (Step S207), and when the gaze movement from the first area to the second area has not been detected as a result of the determination (No at Step S207), the controller 10 can determine whether a deselection operation of the object has been detected (Step S209). When the deselection operation of the object has been detected as a result of the determination (Yes at Step S209), the controller 10 can release the selection state of the object (Step S210) and returns to the procedure at Step S203. In contrast, when the deselection operation of the object has not been detected as a result of the determination (No at Step S209), the controller 10 can return to the procedure at Step S207.

Figure 11:
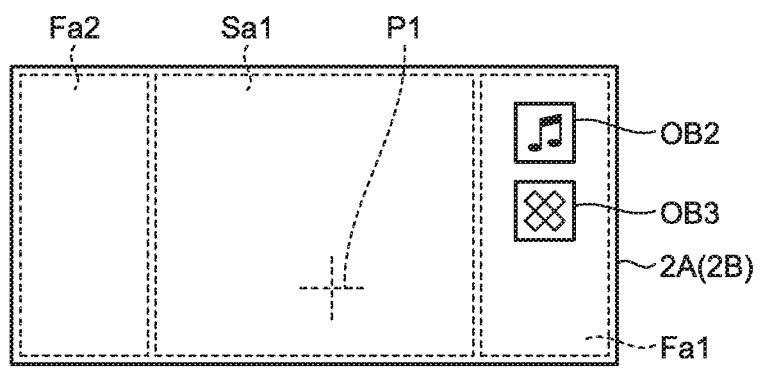
FIG. 11 is a diagram for explaining object display conditions of the wearable device according to the first embodiment.
Figure 12:
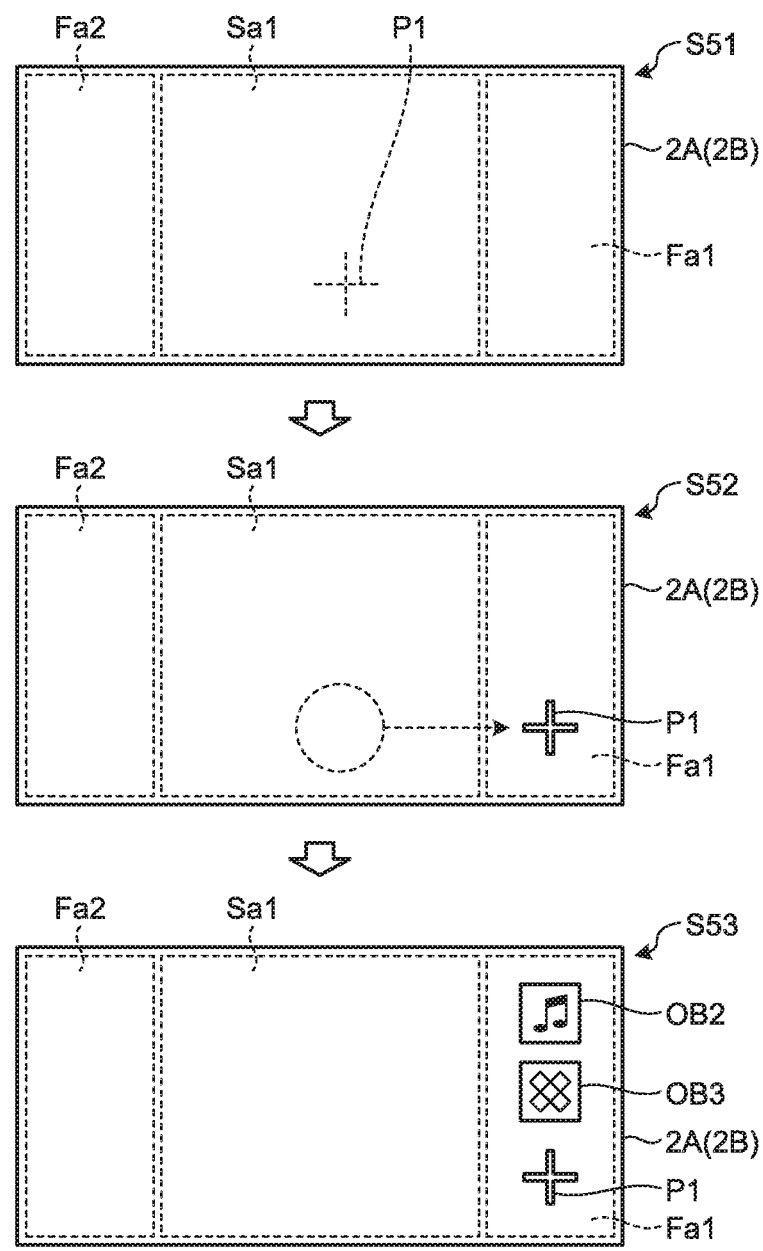
FIG. 12 is a diagram for explaining the object display conditions of the wearable device according to the first embodiment.

Object display conditions of the wearable device 1 according to the first embodiment will be explained below with reference to FIG. 11 and FIG. 12. FIG. 11 and FIG. 12 are diagrams for explaining the object display conditions of the wearable device 1 according to the first embodiment.

When continuous display is set as the object display condition, as illustrated in FIG. 11, the wearable device 1 causes the object OB2 and the object OB3 previously set as the display objects to be displayed in, for example, the first area Fa1 which is previously set as the object display area, in association with lighting of the display.

When detection of the gaze movement from the second area Sa1 to the first area Fa1 is set as the object display condition, as illustrated in FIG. 12, the wearable device 1 causes the object OB2 and the object OB3 previously set as the display objects to be displayed in the first area Fa1 which is previously set as the object display area when the gaze movement from the second area Sa1 to the first area Fa1 is detected (Step S51 to Step S53).

When continuation of a state in which the gaze position is detected within the first area Fa1 for a predetermined period of time or longer is set as the object display condition, the wearable device 1 can cause the object to be displayed in the first area Fa1 when the condition is satisfied.

In the first embodiment, the wearable device 1 virtually divides the display area of the display into a plurality of areas in advance in order for the processing by the controller 10. The wearable device 1 executes the predetermined function corresponding to an object on condition that the gaze movement over the virtual areas is detected while the object displayed in the display is selected. Therefore, according to the first embodiment, the wearable device 1 can prevent an erroneous operation due to user's unintended gaze movement.

Moreover, the wearable device 1 is a wearable device that includes a display having a display area virtually divided into a first area and a second area, which may be defined as a device that executes the predetermined function when the user's gaze position moves from the first area to the second area while an object corresponding to the predetermined function is displayed within the first area.

The wearable device 1 defined in the above manner may further be defined as the device that executes the predetermined function when the user's gaze position moves from an area where the object is displayed to the second area while the object is displayed within the first area. Moreover, the wearable device 1 may be defined as the device that executes the predetermined function when the user's gaze position moves from the second area to the first area while the object is displayed in the first area and thereafter the gaze position moves from the first area to the second area.

Second Embodiment

Figure 13:
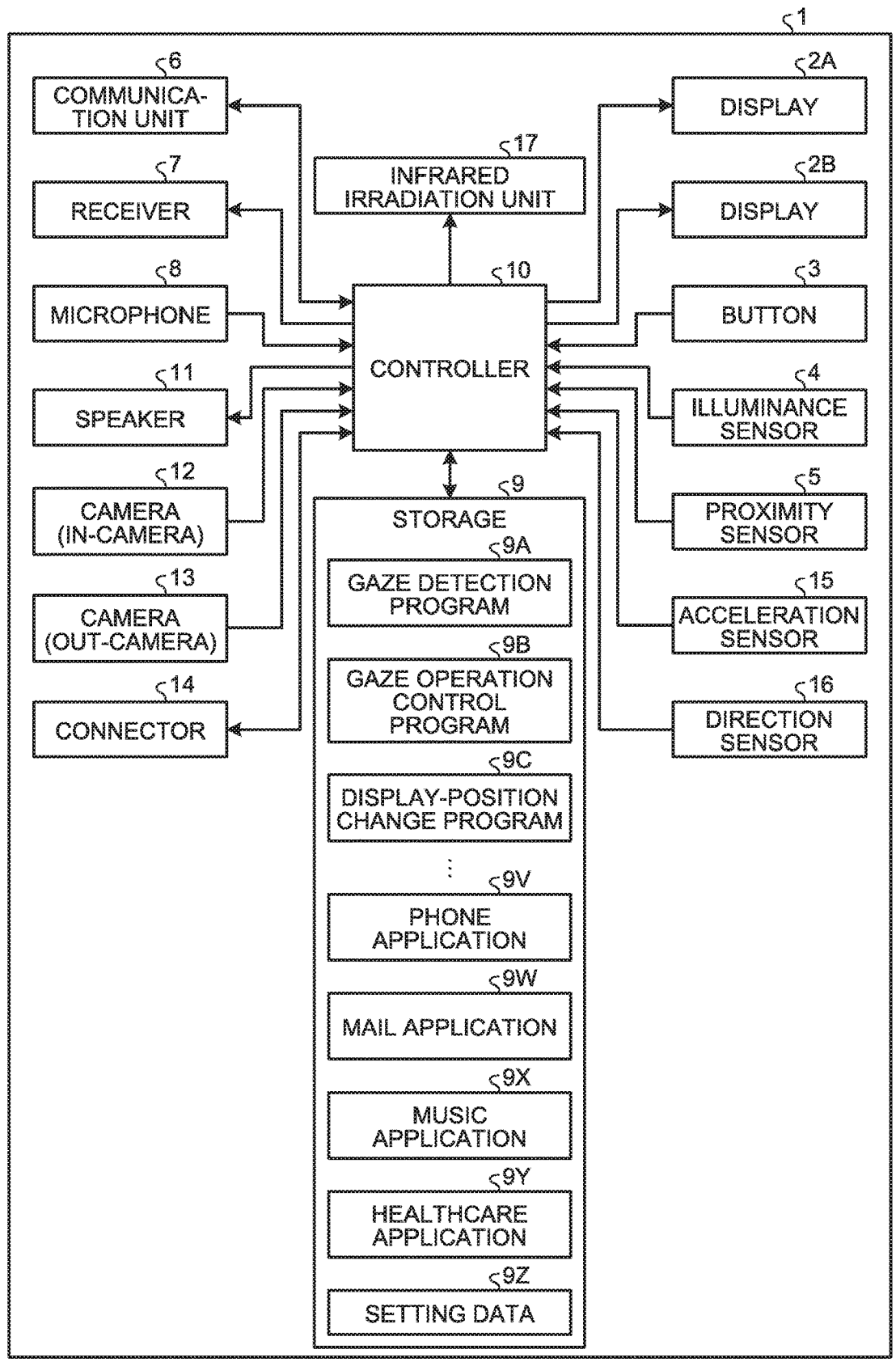
FIG. 13 is a block diagram illustrating a functional configuration of a wearable device according to a second embodiment.

The wearable device 1 may change the display position of the object displayed on the display. In a second embodiment as follows, an example of changing the display position of the object will be explained. FIG. 13 is a block diagram illustrating a functional configuration of a wearable device according to the second embodiment. As for the wearable device according to the second embodiment, the point explained below is different from the first embodiment.

The storage 9 stores a display-position change program 9C. The display-position change program 9C provides the following functions. In other words, when an external subject is detected from the image acquired by the camera 13, the display-position change program 9C determines whether the detected external subject is present at a position visually recognizable by the user via the first area Fa1. For example, when the external subject detected from the image is located on a straight line connecting the position of the user's eyeball and the user's gaze position on the display, the display-position change program 9C determines that the external subject is in the state visually recognizable from the user. When the external subject is present at the position visually recognizable by the user via the first area Fa1 as a result of the determination, the display-position change program 9C changes the display position of the object. For example, when the external subject detected from the image is in the state visually recognizable via the first area Fa1, the display-position change program 9C changes the display position of the object appearing in the first area Fa1 to the first area Fa2. Similarly, the display-position change program 9C changes the display position of the object even when the detected external subject is present at the position visually recognizable by the user via the first area Fa2. That is, the display-position change program 9C changes the display position of the object appearing in the first area Fa2 to the first area Fa1.

For example, when the external subject is detected from the image acquired by the camera 13 that captures the front of the user by executing the display-position change program 9C, the controller 10 can determine whether the detected external subject is present at the position visually recognizable by the user via the first area Fa1. When the external subject is present at the position visually recognizable by the user via the first area Fa1 as a result of the determination, the controller 10 can execute the processing of changing the display position of the object. Similarly, the controller 10 can change the display position of the object even when the detected external subject is present at the position visually recognizable by the user via the first area Fa2. That is, the controller 10 can execute the processing of changing the display position of the object appearing in the first area Fa2 to the first area Fa1.

Figure 14:
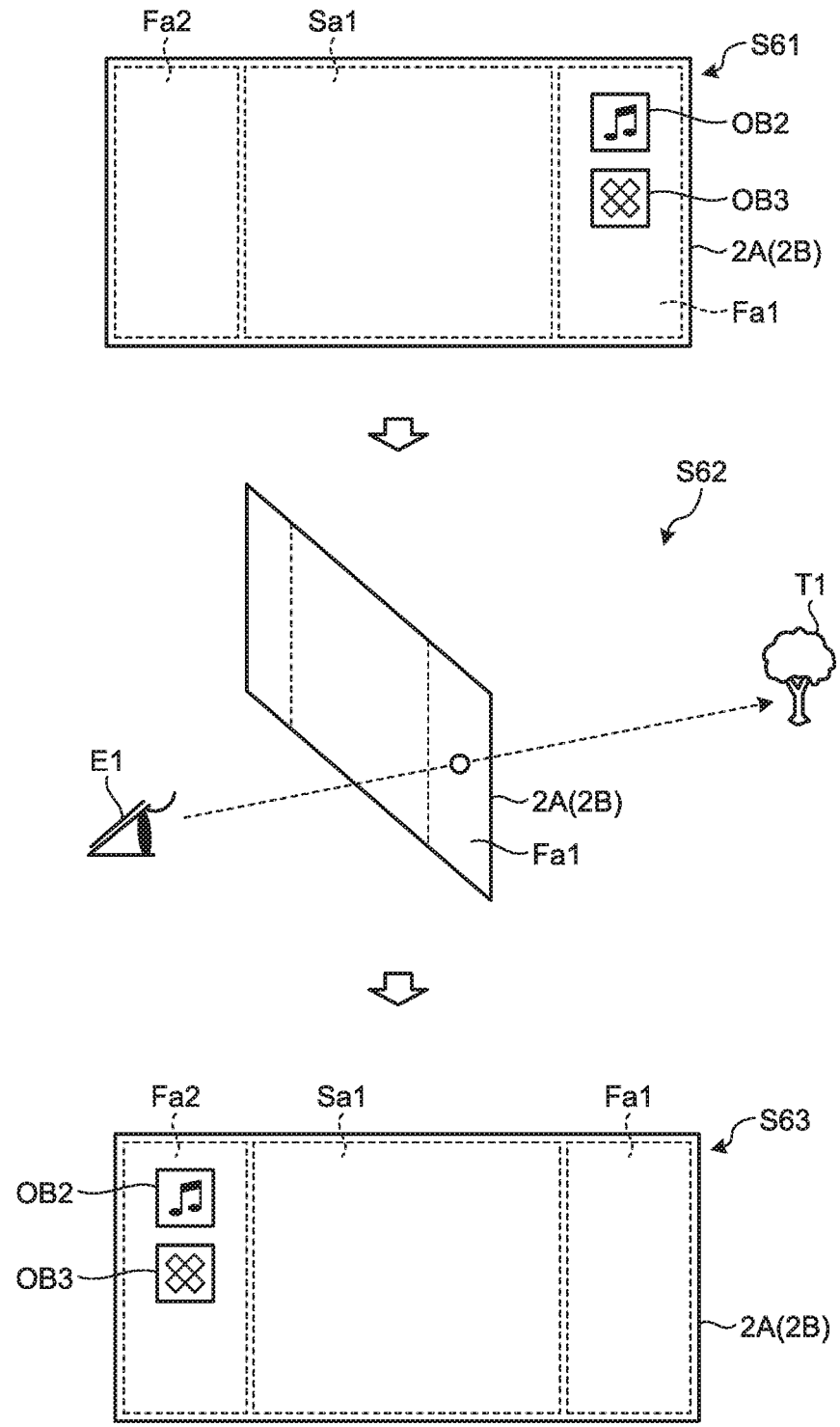
FIG. 14 is a diagram illustrating an overview of processing executed by the wearable device according to the second embodiment.

An overview of processing executed by the wearable device according to the second embodiment will be explained below with reference to FIG. 14. FIG. 14 is a diagram illustrating the overview of processing executed by the wearable device according to the second embodiment. Reference sign µl illustrated in FIG. 14 indicates a user's eye, and reference sign T1 illustrated in FIG. 14 indicates an external subject being present in front of the user.

As illustrated in FIG. 14, the wearable device 1 causes the object OB2 and the object OB3 to be displayed in the first area Fa1 when the object display conditions have been satisfied (Step S61).

Subsequently, the wearable device 1 determines whether the external subject detected from the image acquired by the camera 13 is present at a position visually recognizable by the user via the first area Fa1 (Step S62). When the external subject detected from the image is present at the position visually recognizable by the user via the first area Fa1 as a result of the determination, the wearable device 1 causes the display positions of the object OB2 and the object OB3 appearing in the first area Fa1 to be changed to the first area Fa2 and displayed (Step S63).

Figure 15:
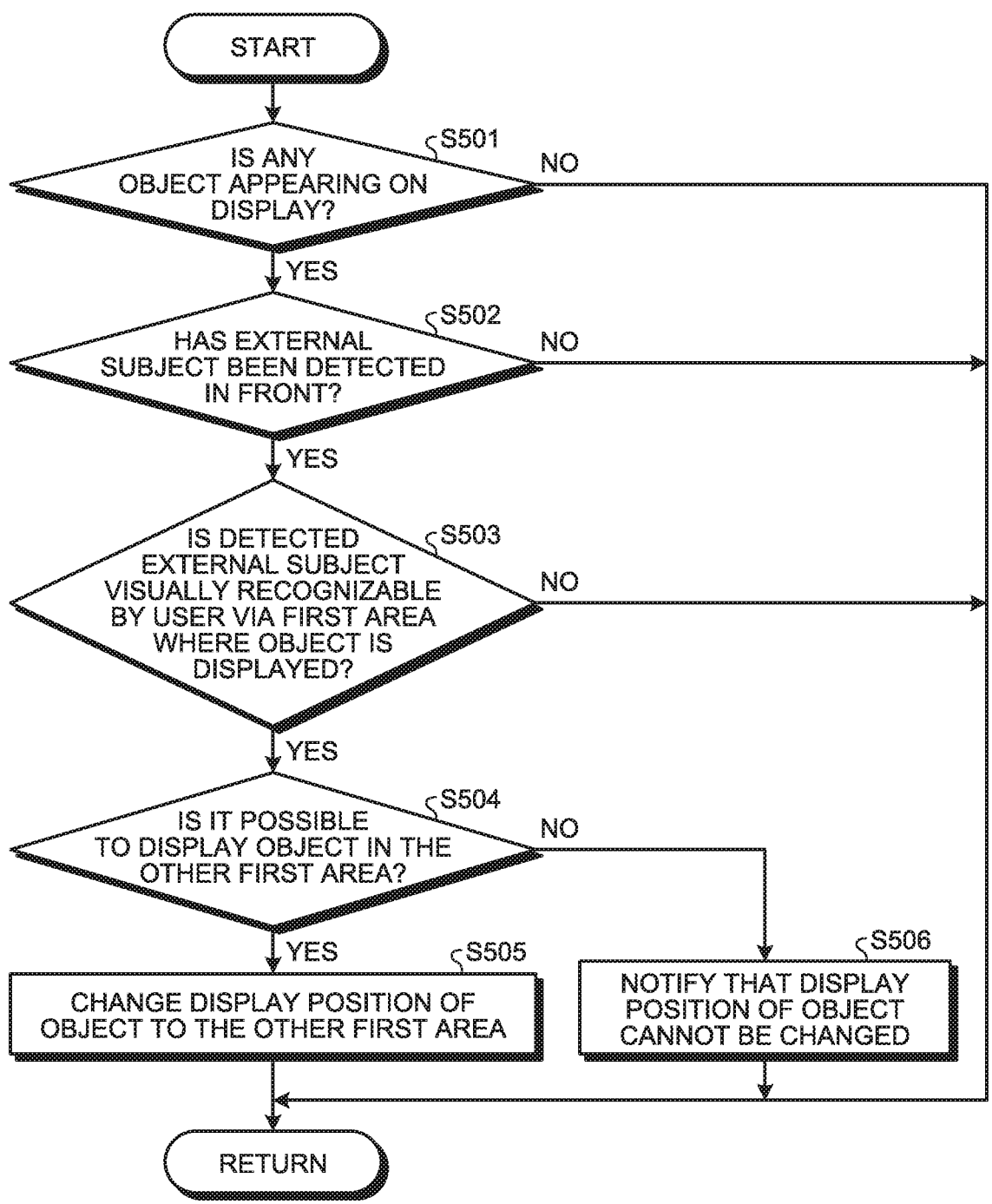
FIG. 15 is a flowchart illustrating a flow of the processing of the wearable device according to the second embodiment.

A flow of the processing of the wearable device according to the second embodiment will be explained below with reference to FIG. 15. FIG. 15 is a flowchart illustrating a flow of the processing of the wearable device according to the second embodiment. The processing illustrated in FIG. 15 is implemented by the controller 10 executing the display-position change program 9C stored in the storage 9. The processing illustrated in FIG. 15 is repeatedly executed during the display of the object. "Object" appearing in the following explanation corresponds to, for example, the object OB2 and the object OB3 illustrated in FIG. 14.

The controller 10 can determine whether any object is appearing on the display (Step S501).

When any object is appearing in the first area of the display as a result of the determination (Yes at Step S501), the controller 10 can determine whether any external subject has been detected from the image acquired by the camera 13 that captures the front of the user (Step S502).

When no external subject has been detected as a result of the determination (No at Step S502), the controller 10 can return to the procedure at Step S501. In contrast, when any external subject has been detected as a result of the determination (Yes at Step S502), the controller 10 can determine whether the detected external subject is present at the position visually recognizable by the user via the first area where the object is displayed (Step S503).

When the detected external subject is not present at the position visually recognizable by the user via the first area where the object is displayed as a result of the determination (No at Step S503), the controller 10 can return to the procedure at Step S501. In contrast, when the detected external subject is present at the position visually recognizable by the user via the first area where the object is displayed as a result of the determination (Yes at Step S503), the controller 10 can determine whether the object can be displayed in the other first area of the display (Step S504). That is, when the detected external subject is not present at the position visually recognizable by the user via the other first area, the controller 10 can determine that the object can be displayed.

When the object can be displayed in the other first area as a result of the determination (Yes at Step S504), the controller 10 can change the display position of the object to the other first area (Step S505). In contrast, when the object cannot be displayed in the other first area as a result of the determination (No at Step S504), the controller 10 can notify the user that the display position of the object cannot be changed (Step S506).

In the processing illustrated in FIG. 15, the example has been explained in which the wearable device 1 changes the display position of the object when the object is displayed, however, the embodiments are not limited to the example. When the object is to be displayed in association with the satisfaction of the object display condition, the wearable device 1 may determine the display position of the object based on the position of the external subject detected from the image acquired by the camera 13 that captures the front of the user. For example, when the detected external subject is present at the position visually recognizable by the user via the first area where the object is displayed, the wearable device 1 determines the other first area in the display as the display position of the object. When the object cannot be displayed due to the presence of the detected external subject at the position visually recognizable by the user via the other first area, the wearable device 1 notifies the user that the object cannot be displayed. The examples illustrated in FIG. 14 and FIG. 15 indicate that when the external subject detected from the image acquired by the camera 13 is present at the position visually recognizable by the user via the first area Fa1, the wearable device 1 changes the display positions of the object OB2 and the object OB3 appearing in the first area Fa1 to the first area Fa2, however, the embodiments are not limited to the example. For example, the wearable device 1 may be configured to further divide the first area Fa1 into a plurality of virtual areas, determine whether the external subject detected from the image acquired by the camera 13 is visually recognized by the user via any one of the divided areas in the first area Fa1, and change the display positions of the object OB2 and the object OB3 to the other area different from the area visually recognized by the user.

Third Embodiment

Figure 16:
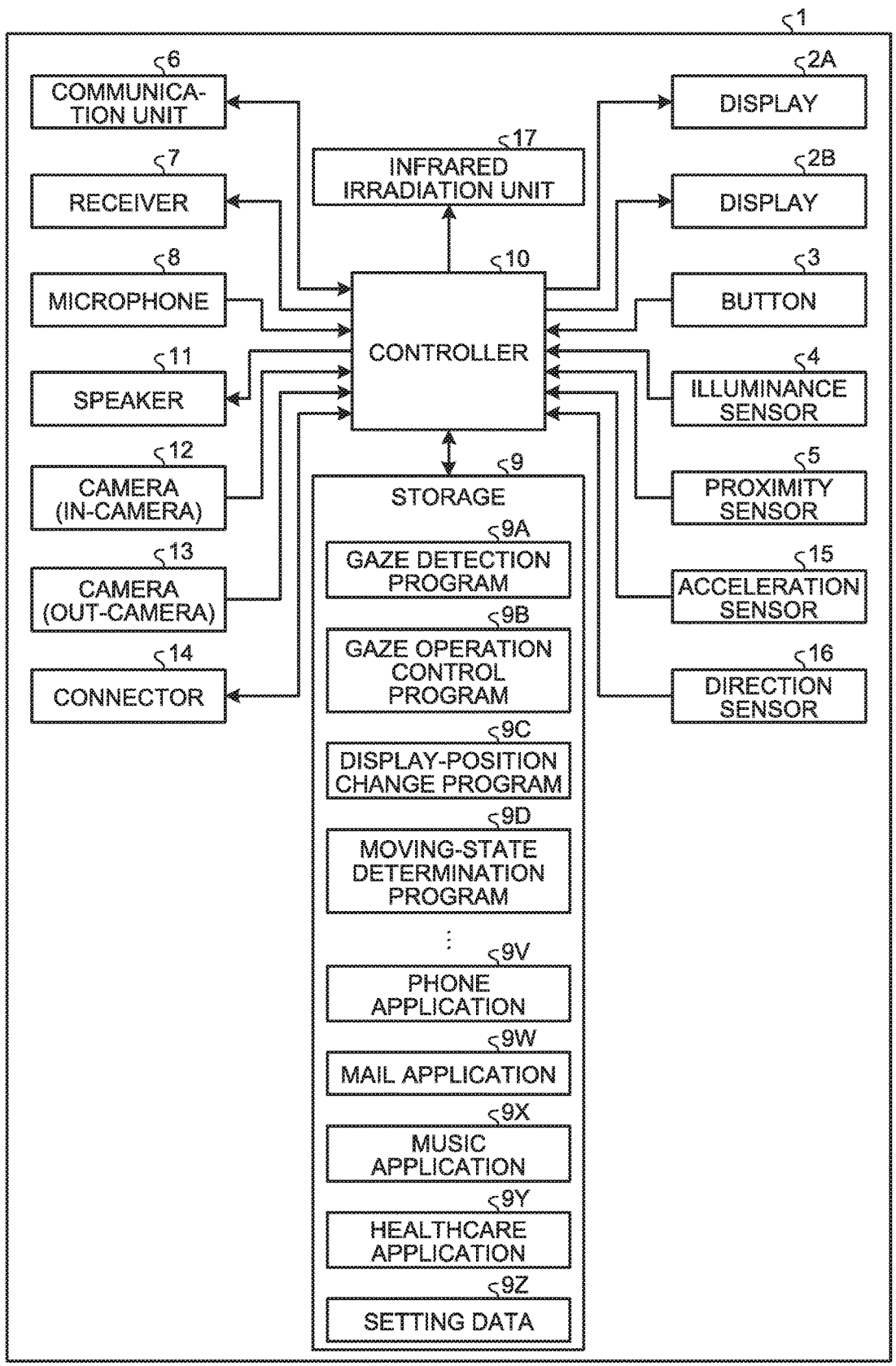
FIG. 16 is a block diagram illustrating a functional configuration of a wearable device according to a third embodiment.

The wearable device 1 may change an object to be displayed on the display according to the moving state of the user. When the user is in the moving state, the wearable device 1 may restrict part of the predetermined function corresponding to the object according to the movement type. FIG. 16 is a block diagram illustrating a functional configuration of a wearable device according to a third embodiment. As for the wearable device according to the third embodiment, the point explained below is different from the embodiments. In the following description, the term "first area" corresponds to the first area Fa1 or the first area Fa2. In the following description, the term "second area" corresponds to the second area Sa1.

The storage 9 stores a moving-state determination program 9D. The moving-state determination program 9D provides following functions. A first function provided by the moving-state determination program 9D is to determine whether the user is in the moving state when an object is to be displayed in the first area, and change the type of the object to be displayed in the first area according to whether the user is in the moving state. For example, the moving-state determination program 9D determines whether the user is in the moving state based on the detection result of the acceleration sensor 15.

A second function provided by the moving-state determination program 9D is to change the type of the object to be displayed in the first area according to whether the user is in the moving state, and further, restrict, when the user is in the moving state, the execution of some functions included in the predetermined function corresponding to the object according to the type of the moving state. For example, the moving-state determination program 9D determines whether the user is in the moving state based on the detection result of the acceleration sensor 15 and determines the type of the moving state. The determination of the type of the moving state is implemented by the moving-state determination program 9D comparing acceleration patterns according to the type of the moving state of the user with detection results of the acceleration sensor 15.

The setting data 9Z stored in the storage 9 includes data used for the processing provided by the moving-state determination program 9D. For example, the setting data 9Z includes the acceleration patterns according to the type of the moving state of the user. For example, the setting data 9Z includes data in which an executable function is set for each application according to the movement type.

The controller 10 can execute the following processes by executing the moving-state determination program 9D. As one of the processes, the controller 10 determine whether the user is in the moving state when the object is to be displayed in the first area, and change the type of the object to be displayed in the first area according to whether the user is in the moving state. As another process, when the user is in the moving state, the controller 10 can further restrict the execution of some functions included in the predetermined function corresponding to the object according to the type of the moving state.

Figure 17:
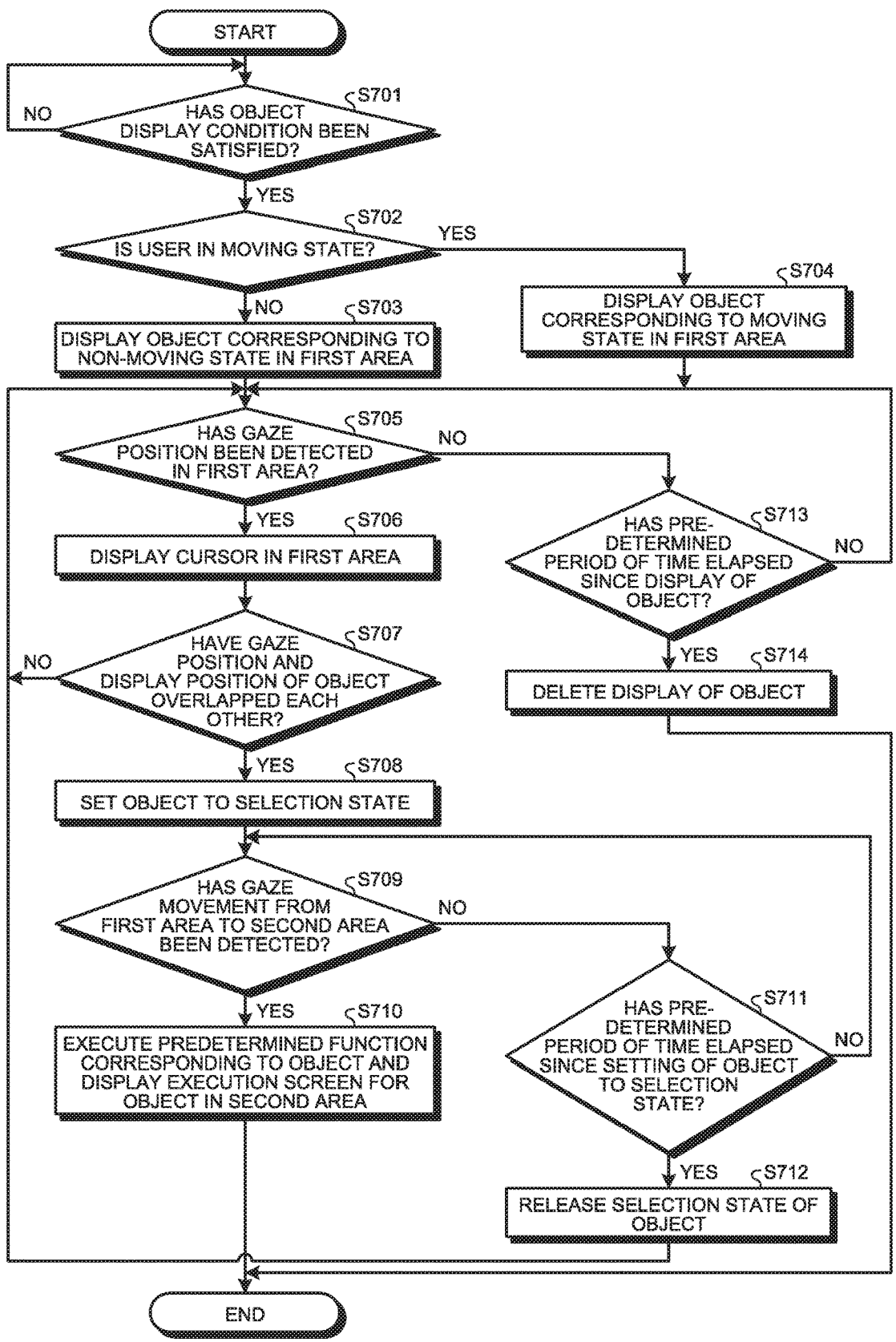
FIG. 17 is a flowchart illustrating a flow of processing executed by the wearable device according to the third embodiment.
Figure 19:
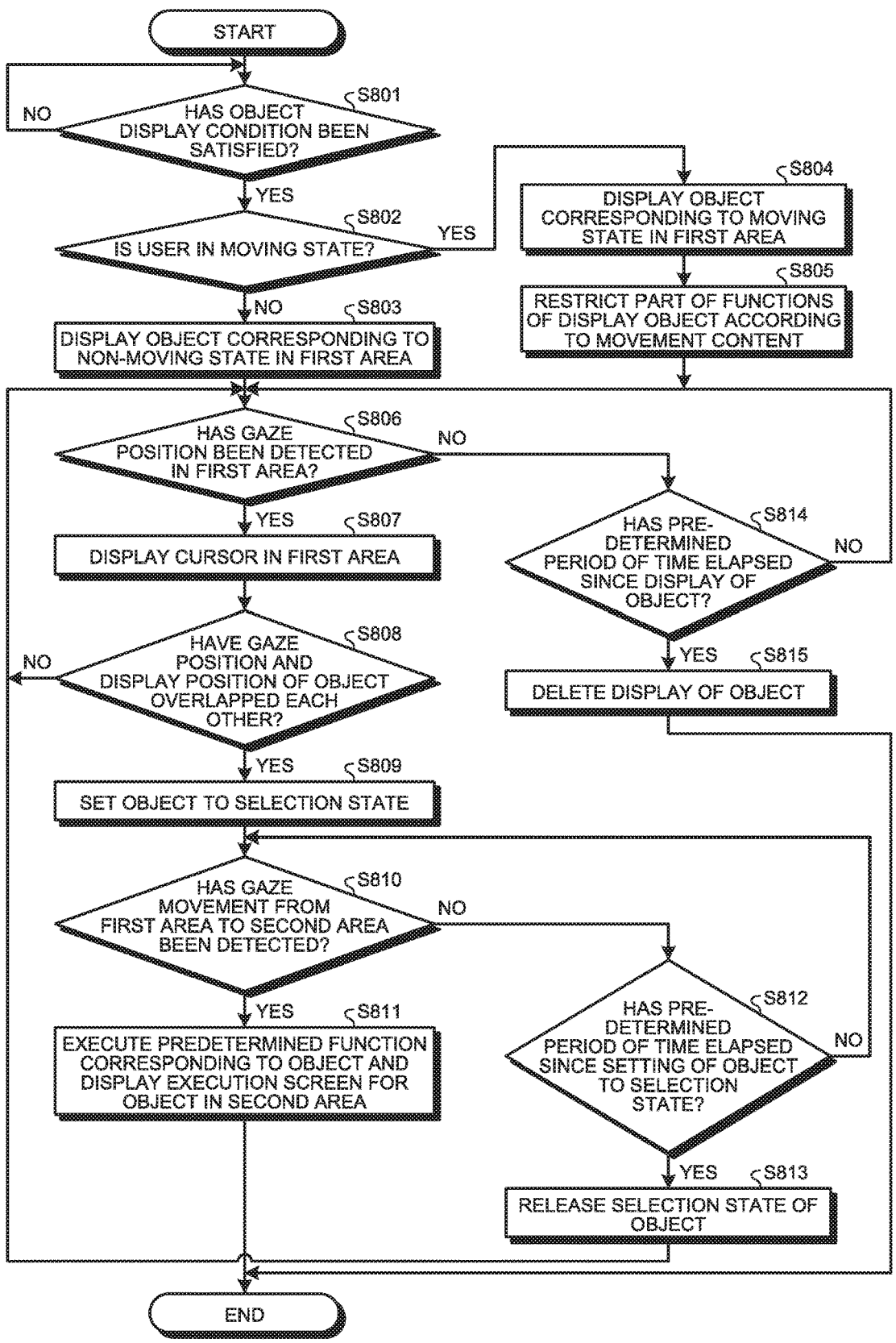
FIG. 19 is a flowchart illustrating a flow of the processing executed by the wearable device according to the third embodiment.

An overview of processing executed by the wearable device according to the third embodiment will be explained below with reference to FIG. 17 to FIG. 20. FIG. 17 and FIG. 19 are flowcharts illustrating a flow of the processing executed by the wearable device according to the third embodiment. FIG. 18 is a diagram illustrating an example of objects to be displayed in the first area according to the third embodiment. FIG. 20 is a diagram illustrating an example of restriction of predetermined functions according to the third embodiment. The processing illustrated in FIG. 17 and FIG. 19 is implemented by the controller 10 executing the gaze detection program 9A, the gaze operation control program 9B, and the moving-state determination program 9D stored in the storage 9. "Object" appearing in the following explanation corresponds to the object OB1 to object OB3 illustrated in FIG. 4 to FIG. 8. "First area" appearing in the following explanation corresponds to the first area Fa1 or the first area Fa2 illustrated in FIG. 3, and "second area" corresponds to the second area Sa1 illustrated in FIG. 3. In addition, "cursor" appearing in the following explanation corresponds to the image P1 indicating the user's gaze position in FIG. 4 to FIG. 8.

As illustrated in FIG. 17, the controller 10 can determine whether the object display condition has been satisfied (Step S701).

When the object display condition has not been satisfied as a result of the determination (No at Step S701), the controller 10 can repeat the same determination. In contrast, when the object display condition has been satisfied (Yes at Step S701), the controller 10 can determine whether the user is in the moving state (Step S702).

When the user is not in the moving state as a result of the determination (Not at Step S702), the controller 10 can cause the object corresponding to a non-moving state to be displayed in the first area (Step S703). In contrast, when the user is in the moving state as a result of the determination (Yes at Step S702), the controller 10 can cause the object corresponding to the moving state to be displayed in the first area (Step S704). For example, as illustrated in FIG. 18, when the user is not in the moving state, the controller 10 can cause more types of applications to be displayed in the first area than types when the user is in the moving state.

Subsequently, the controller 10 can determine whether the gaze position has been detected in the first area (Step S705).

When the gaze position has been detected in the first area as a result of the determination (Yes at Step S705), the controller 10 can cause the cursor to be displayed in the first area (Step S706).

Subsequently, the controller 10 can determine whether the gaze position and the display position of the object have overlapped with each other in the first area (Step S707).

When the gaze position and the display position of the object have overlapped with each other in the first area as a result of the determination (Yes at Step S707), the controller 10 can set the object to the selection state (Step S708).

Subsequently, the controller 10 can determine whether the gaze movement from the first area to the second area has been detected while the object is selected (Step S709).

When the gaze movement from the first area to the second area has been detected as a result of the determination (Yes at Step S709), the controller 10 can execute the predetermined function corresponding to the object, cause an execution screen of the object to be displayed in the second area (Step S710), and end the processing illustrated in FIG. 17.

At Step S709, when the gaze movement from the first area to the second area has not been detected as a result of the determination (No at Step S709), the controller 10 can determine whether a predetermined period of time has elapsed since the setting of the object to the selection state (Step S711).

When a predetermined period of time has not elapsed since the setting of the object to the selection state as a result of the determination (No at Step S711), the controller 10 can return to the procedure at Step S709. In contrast, when a predetermined period of time has elapsed since the setting of the object to the selection state as a result of the determination (Yes at Step S711), the controller 10 can release the selection state of the object (Step S712) and return to the procedure at Step S705.

At Step S707, when the gaze position and the display position of the object have not overlapped with each other in the first area as a result of the determination (No at Step S707), the controller 10 can return to the procedure at Step S705.

At Step S705, when the gaze position has not been detected in the first area as a result of the determination (No at Step S705), the controller 10 can determine whether a predetermined period of time has elapsed since the display of the object in the first area (Step S713).

When a predetermined period of time has not elapsed since the display of the object in the first area as a result of the determination (No at Step S713), the controller 10 can return to the procedure at Step S705. In contrast, when a predetermined period of time has elapsed since the display of the object in the first area as a result of the determination (Yes at Step S713), the controller 10 can delete the display of the object from the first area (Step S714), and end the processing illustrated in FIG. 17.

In the processing illustrated in FIG. 17, instead of the procedure at S711, it may be determined whether the deselection operation of the object has been detected as is the procedure at Step S209 illustrated in FIG. 10.

In the flow of the processing illustrated in FIG. 19, the procedure at Step S805 illustrated in FIG. 19 is different from the flow of the processing illustrated in FIG. 17. In other words, when the user is in the moving state (Yes at Step S802), the controller 10 can cause the object corresponding to the moving state to be displayed in the first area (Step S804), and restrict part of the function corresponding to the object to be displayed according to the movement type (Step S805). For example, as illustrated in FIG. 20, the controller 10 can restrict part of the function by changing the function that can be executed for each application according to whether the user is walking.

The wearable device 1 explained in the embodiments may include a touch sensor. The touch sensor detects a contact of a finger or the like with the touch sensor. The touch sensor notifies the controller 10 of the contact of the finger with the touch sensor. The controller 10 can control an operation of an object to be displayed on the display based on at least one of a contact detected by the touch sensor, a position where the contact is detected, a change of the position where the contact is detected, an interval between detected contacts, and the number of detection times of the contacts. The detection method of the touch sensor may be any detection method such as a capacitive type detection method, a resistive film type detection method, a surface acoustic wave type (or ultrasonic type) detection method, an infrared type detection method, an electromagnetic induction type detection method, and a load sensing type detection method.

The embodiments indicate for example that the wearable device 1 is configured to set an object to a selection state when the use's gaze position is within the first area, when the use's gaze position overlaps with the object, or when the use's gaze position overlaps with the object for a predetermined period of time, however, the embodiments are not limited thereto. For example, the wearable device 1 may have a configuration of setting an object to a selection state when the user blinks a predetermined number of times or more within a predetermined period of time while the use's gaze position overlaps with the object.

Although the art of appended claims has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A wearable device comprising:
    a display having a display area virtually divided into a first area provided at an end of the display and a second area provided at a center of the display;
    an image acquisition unit configured to acquire an image in front of a user; and
    a controller configured to
        detect a user's gaze position with respect to the display and a user's gaze movement in the display, and
        in response to the user's gaze position moving from the first area to the second area while an object corresponding to a predetermined function is displayed within the first area, execute the predetermined function, wherein
    the controller is configured to
        set the first area and the second area,
        select, in response to the gaze position being detected within the first area while an object corresponding to the predetermined function is displayed within the first area, the object based on the detected gaze position, and
        execute the predetermined function in response to the gaze movement from the first area to the second area being detected while the object is selected, and
    when an external subject is detected from the image, the controller is configured to determine whether the detected external subject is present at a position visually recognizable by the user via the first area, and change the display position of the object appearing in the first area when the external subject is present at the position visually recognizable by the user via the first area as a result of the determination.

2. The wearable device according to claim 1, wherein when the user's gaze position moves to the second area from an area where the object is displayed while the object is displayed within the first area,
the predetermined function is executed.

3. The wearable device according to claim 1, wherein when the user's gaze position moves from the second area to the first area while the object is displayed within the first area and thereafter the user's gaze position moves from the first area to the second area,
the predetermined function is executed.

4. The wearable device according to claim 3, wherein when the user's gaze position moves from the second area to the first area while the object is displayed within the first area and thereafter the user's gaze position moves to the second area from the area where the object within the first area is displayed,
the predetermined function is executed.

5. The wearable device according to claim 1, wherein the controller is configured to cause an execution screen for the predetermined function to be displayed in the second area with the execution of the predetermined function.

6. The wearable device according to claim 1, wherein the controller is configured to cause the object to be previously displayed in the first area.

7. The wearable device according to claim 1, wherein the controller is configured to cause the object to be displayed in the first area when the gaze movement from the second area to the first area is detected.

8. The wearable device according to claim 1, wherein when a state in which the gaze position is detected within the first area continues for a predetermined period of time or more,
the controller is configured to cause the object to be displayed in the first area.

9. The wearable device according to claim 1, wherein the controller is configured to cause an image indicating the gaze position to be displayed in the first area and the second area.

10. The wearable device according to claim 1, wherein the controller is configured to cause an image indicating the gaze position to be displayed in the second area when the gaze position is detected within the second area, and cause the image indicating the gaze position to be displayed in the first area on condition that a predetermined period of time elapses since the display of the object in the first area.

11. The wearable device according to claim 1, wherein when a plurality of objects are displayed in the first area,
the controller is configured to set an object, of which display position and the gaze position overlap with each other in the first area, to a selection state capable of executing a predetermined function corresponding to the object.

12. The wearable device according to claim 1, wherein the controller is configured to set a release area for releasing selection of an object within the first area, and release the selection of the object when the gaze position is detected within the release area.

13. The wearable device according to claim 1, wherein when the gaze movement from the first area to the second area is not detected within a predetermined period of time while the object is selected,
the controller is configured to release the selection of the object.

14. The wearable device according to claim 1, wherein the controller is configured to determine whether the user is in a moving state when the object is to be displayed in the first area, and change a type of the object to be displayed in the first area according to whether the user is in the moving state.

15. The wearable device according to claim 14, wherein when the user is in the moving state as a result of determination as to whether the user is in the moving state,
the controller is configured to restrict execution for part of functions included in the predetermined function according to a content of the moving state.

16. The wearable device according to claim 1, wherein when the user's gaze position moves to the second area from the first area, a gaze operable object is displayed at a position that does not overlap with the gaze position after the movement of the user's gaze position in the second area.

17. A control method executed by a wearable device including a display in which virtually divided first area and second area are set, the control method comprising:
detecting a user's gaze position with respect to the display and a user's gaze movement in the display;
setting the first area and the second area;
selecting, in response to the gaze position being detected within the first area while an object corresponding to a predetermined function is displayed within the first area, the object based on the detected gaze position;
executing a predetermined function in response to the gaze movement from the first area to the second area being detected while the object is selected;
acquiring an image in front of a user;
determining, when an external subject is detected from the image, whether the detected external subject is present at a position visually recognizable by the user via the first area; and
changing the display position of the object appearing in the first area when the external subject is present at the position visually recognizable by the user via the first area as a result of the determination.

18. A non-transitory computer readable recording medium storing thereon a control program for causing a wearable device including a display in which virtually divided first area and second area are set to execute:
detecting a user's gaze position with respect to the display and a user's gaze movement in the display;
setting the first area and the second area;
selecting, in response to the gaze position being detected within the first area while an object corresponding to a predetermined function is displayed within the first area, the object based on the detected gaze position;
executing a predetermined function when the gaze movement from the first area to the second area being detected while the object is selected;
acquiring an image in front of a user;
determining, when an external subject is detected from the image, whether the detected external subject is present at a position visually recognizable by the user via the first area; and
changing the display position of the object appearing in the first area when the external subject is present at the position visually recognizable by the user via the first area as a result of the determination.

19. A wearable device comprising:
a display having a display area virtually divided into a first area provided at an end of the display and a second area provided at a center of the display; and
a controller configured to
  detect a user's gaze position with respect to the display and a user's gaze movement in the display, and
  in response to the user's gaze position moving from the first area to the second area while an object corresponding to a predetermined function is displayed within the first area, execute the predetermined function, wherein
the controller is configured to
  set the first area and the second area,
  select, in response to the gaze position being detected within the first area while an object corresponding to the predetermined function is displayed within the first area, the object based on the detected gaze position, and
  execute the predetermined function in response to the gaze movement from the first area to the second area being detected while the object is selected,
the controller is configured to
  not cause an image indicating the user's gaze position to be displayed in the first area and the second are when detecting the user's gaze position in the second area, and
  cause the image indicating the user's gaze position to be displayed only in the first area when detecting the user's gaze position in the second area.

\* \* \* \* \*